US006745120B2

(12) United States Patent
Iwagami et al.

(10) Patent No.: US 6,745,120 B2
(45) Date of Patent: Jun. 1, 2004

(54) VEHICLE-MOUNTED ELECTRONIC CONTROL APPARATUS

(75) Inventors: Yuki Iwagami, Tokyo (JP); Kohji Hashimoto, Tokyo (JP); Hiroshi Gokan, Tokyo (JP); Junya Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/263,756

(22) Filed: Oct. 4, 2002

(65) Prior Publication Data

US 2003/0187569 A1 Oct. 2, 2003

(30) Foreign Application Priority Data

Mar. 28, 2002 (JP) .................................... P 2002-092402

(51) Int. Cl.[7] .......................... G06F 13/00; G06F 19/00; F02D 45/00

(52) U.S. Cl. ....................... 701/114; 701/115; 701/102; 701/29; 340/439; 340/425.5

(58) Field of Search ................................ 701/114, 115, 701/102, 101, 29, 30, 33, 35; 340/425.5, 459, 438, 439

(56) References Cited

U.S. PATENT DOCUMENTS 6,442,458 B2 * 8/2002 Kubo et al. ................... 701/29
6,640,259 B2 * 10/2003 Nakamoto et al. ............. 710/5
6,678,586 B2 * 1/2004 Nakamoto et al. .......... 701/114

FOREIGN PATENT DOCUMENTS

| | | |
|---|---|---|
| JP | 5-128065 | 5/1993 |
| JP | 7-13912 | 1/1995 |
| JP | 7-269409 | 10/1995 |
| JP | 2002-89351 | 3/2002 |
| JP | 2002-108835 | 4/2002 |

* cited by examiner

*Primary Examiner*—Hieu T. Vo
(74) *Attorney, Agent, or Firm*—Sughrue Mion, PLLC

(57) ABSTRACT

A vehicle-mounted communication control apparatus includes: microprocessor 110*a* to which serial-parallel converter 117 for master station is connected; and common control circuit 120*a* to which serial-parallel converter 127 for substation is serial-connected to serial-parallel converter 117. The control apparatus includes first storage device 300 for storing transmission from master station to substation; distribution storage device 313 for transferring command data to device memory when command data stored in first storage device 300 is write/setting command; reply packet generation device 317 for generating up-reply information to microprocessor 110*a*; second storage device 320 for reading out on the principle of preceding input or preceding output while storing in order reply information and evacuating the delay; and reply packet composing device 338 for adding latest information to reply information and sending back resultant reply information.

15 Claims, 10 Drawing Sheets

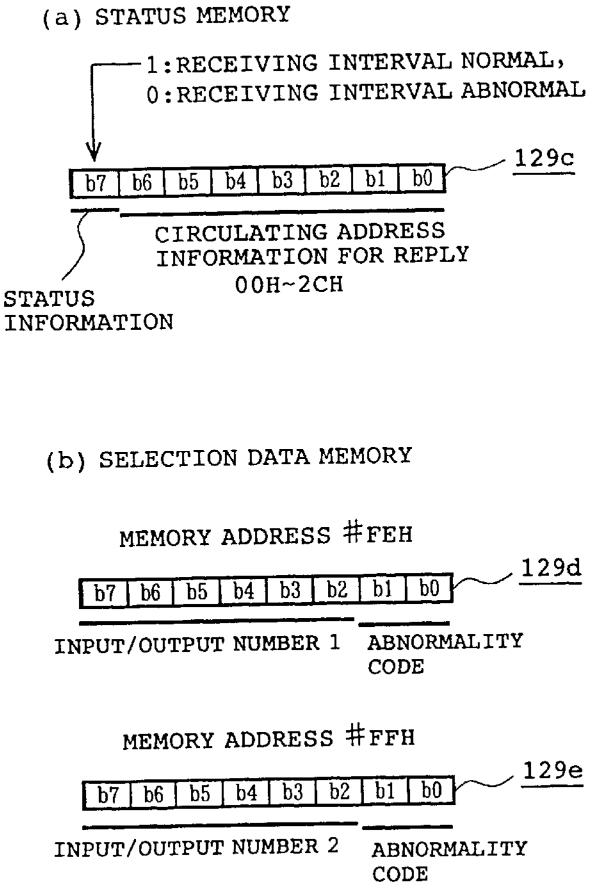

(c): REGULAR REPLY DATA MAP

| REPLY DATA 1 | REPLY DATA 2 | REPLY DATA 3 (STATUS + CIRCULATING ADDRESS) | REMARKS |
|---|---|---|---|
| INPUT GROUP A · 8 POINTS | INPUT GROUP B · 8 POINTS | 0 H | ON/OFF INPUT |
| HIGH-ORDER 8 BITS | LOW-ORDER 8 BITS | 1 H | ANALOG 1 |
| SELECTION DATA MEMORY 1 | SELECTION DATA MEMORY 2 | 2 H | SELECTION DATA MEMORY |
| INPUT GROUP A · 8 POINTS | INPUT GROUP B · 8 POINTS | 3 H | ON/OFF INPUT |
| HIGH-ORDER 8 BITS | LOW-ORDER 8 BITS | 4 H | ANALOG 2 |
| SELECTION DATA MEMORY 1 | SELECTION DATA MEMORY 2 | 5 H | SELECTION DATA MEMORY |
| INPUT GROUP A · 8 POINTS | INPUT GROUP B · 8 POINTS | 6 H | ON/OFF INPUT |
| HIGH-ORDER 8 BITS | LOW-ORDER 8 BITS | 7 H | ANALOG 3 |
| SELECTION DATA MEMORY 1 | SELECTION DATA MEMORY 2 | 8 H | SELECTION DATA MEMORY |
| ⋮ | ⋮ | ⋮ | ⋮ |
| INPUT GROUP A · 8 POINTS | INPUT GROUP B · 8 POINTS | 2A H | ON/OFF INPUT |
| HIGH-ORDER 8 BITS | LOW-ORDER 8 BITS | 2B H | ANALOG 15 |
| SELECTION DATA MEMORY 1 | SELECTION DATA MEMORY 2 | 2C H | SELECTION DATA MEMORY |

FIG. 9

VEHICLE-MOUNTED ELECTRONIC CONTROL APPARATUS

BACKGROUND OF THE INVENTION

1. Field of the Invention

The present invention relates to an electronic control apparatus incorporating therein a microprocessor used for controlling an internal combustion engine for vehicle and, more particularly, to a vehicle-mounted electronic control apparatus that includes a serial communication function to mutually communicate an input/output signal or the like.

2. Background Arts

Hitherto, several vehicle-mounted electronic control systems that carries out an information exchange by serial communication between a pair of microprocessors sharing functions have been disclosed in, for example, the Japanese Patent Publication (unexamined) No. 269409/1995, the Japanese Patent Publication (unexamined) No. 128065/1993, the Japanese Patent Publication (unexamined) No. 13912/1995, etc. Among those known control systems, the Japanese Patent Publication (unexamined) No. 269409/1995 disclosed a technique arranged as follows. That is, in the case of transmitting data from a main CPU for controlling a fuel to a sub CPU for controlling a transmission, a SUM value of whole data of a CPU on the transmitting side is calculated, an equivalent value to this SUM value is added to a rearmost part of a data stream (data message) and the resultant data stream is transmitted. Then a CPU on the receiving side calculates a SUM value of the whole data resulted from removing the rearmost data and compares the SUM value with the rearmost data thereby checking whether or not abnormality is present in the received data.

Further, the Japanese Patent Publication (unexamined) No. 128065/1993 disclosed a technique arranged for controlling an internal combustion engine using two CPUs in the following manner. In this known technique, a hand-shaking line is provided between a master CPU and a slave CPU, and after completing a receiving process of the data transmitted from the master CPU, the slave CPU transmits a signal indicating completion of the receiving process via the hand-shaking line. The master CPU receives the signal indicating completion of the receiving process and then starts transmitting the next data thereby making it possible to transmit data at a high speed without fail.

Furthermore, the technique disclosed in the Japanese Patent Publication (unexamined) No. 13912/1995 relates to communication between a CPU and a serial communication block not having any CPU. This communication technique is arranged in such a manner as to provide shift registers on both CPU and serial communication sides respectively, and a shift destination of high-order-bit from one of the shift registers is established to be low-order-bit of the other shift register. Accordingly the CPU simultaneously executes transmitting instruction data and receiving reply data to shorten a processing time.

It is a recent trend that the vehicle-mounted electronic control system has to control varieties of contents, and contents to be processed in the microprocessor and information exchange between the microprocessors have been complicated. For example, in a control system including a master station and substations, it has becomes a problem to be solved how to transmit and receive efficiently a large amount of information communication mutually between the master station and the substations are selected.

In view of overcoming such a problem, when studying the mentioned technique disclosed in the Japanese Patent Publication (unexamined) No. 269409/1995, for example, it is certain that reliability in data communication can be achieved, but the technique is not always arranged so as to select a large amount of communication information and efficiently transmit and receive them.

When studying the technique disclosed in the Japanese Patent Publication (unexamined) No. 128065/1993, it is found that this technique intends to carry out a high-speed communication continuously without duplication. For that purpose, a signal indicating completion of receiving is transmitted via the hand-shaking line, and the master CPU executes the next transmission after receiving the signal indicating the completion of receiving. Further a data list representing type, sequence or amount of data to be data-exchanged is stored in a program memory of each microprocessor, and a data list conforming to various communication periods is to be selected. However, a problem exits in that this known communication technique is deficient in freedom of carrying out a variety of communication.

Furthermore, when studying the technique disclosed in the Japanese Patent Publication (unexamined) No. 13912/1995, a shift register is provided on each of transmitting and receiving sides, and serial-parallel conversion is conducted, thereby transmitting instruction data and receiving input data are done at the same time to shorten a processing time. However, a problem exists in that the technique is not always arranged so as to be capable of selecting a large amount of communication information, and efficiently transmitting and receiving them.

SUMMARY OF THE INVENTION

The present invention has been made to solve the above-discussed problems, and has an object of providing communication control means having a high degree of freedom in which, even if a data amount of down-communication from a master station to a substation is not balanced with that of up-communication from the substation to the master station and such an unbalance fluctuates depending on operating conditions of a microprocessor thereby occurring any jam or delay in communication to or from one station, such delay does not affect communication to and from the other station, and the latest information can be added to the jammed and delayed communication data.

Another object of the invention is to provide a vehicle-mounted electronic control apparatus capable of putting together and cutting down a large amount of irregular up-communication data, and suppressing the delay in up-communication from the substation to the master station which delay is liable to occur in communication operation state.

A vehicle-mounted electronic control apparatus according to the invention includes: a microprocessor in which a program memory, an operational RAM, an interface circuit providing a connection to a first vehicle-mounted sensor group, an interface circuit providing a connection to a first electrical load group, and a serial-parallel converter for master station are bus-connected; and a common control circuit in which a serial-parallel converter for substation that is serial-connected to the serial-parallel converter for master station, an interface circuit providing a connection to a second vehicle-mounted sensor group, and an interface circuit providing a connection to a second electrical load group are bus-connected, the common control circuit being provided with first storage means, second storage means, abnormality determination means, distribution storage means, reply packet generation means, and reply packet composing means. In this vehicle-mounted electronic control apparatus, the first storage means stores in sequential order command data, address data, write data, sum check collation data received by the serial-parallel converter for substation via the serial-parallel converter for master station. The abnormality determination means monitors lack or mixing of any bit information in the data stored in the first storage means. The distribution storage means transfers the write data to a device memory of a specified address based on the stored address data and write data when the command data stored in the first storage means is a write/setting command accompanied by the write data. The reply packet generation means selects reply data based on the result determined by the abnormality determination means and the command data, combines the foregoing reply data with the address data to synthesize reply information. The reply information generated by the reply packet generation means is stored in sequential order into the second storage means, and read out on the basis of a preceding input/preceding output while evacuating a delay in replying. The reply packet composing means composes in a predetermined order plural reply information to be supplied to the serial-parallel converter for substation based on the reply information read out from the second storage means. Then the reply packet composing means generates additional data based on the latest information and adds those data to the delayed and held reply information to send back resultant reply information.

In the vehicle-mounted electronic control apparatus of above arrangement, down-communication can be continued without delay by the second storage means that conducts a preceding input/preceding output operation even if any delay occurs temporarily in up-communication. Further the latest readout information can be added to the delayed reply data, and the resultant reply information can be sent back. As a result, freedom in transmit/receiving timing is improved thus making it possible to carry out an efficient serial communication.

Another vehicle-mounted electronic control apparatus according to the invention includes: a microprocessor in which a program memory, an operational RAM, an interface circuit providing a connection to a first vehicle-mounted sensor group, an interface circuit providing a connection to a first electrical load group, and a serial-parallel converter for master station are bus-connected; and a common control circuit in which a serial-parallel converter for substation that is serial-connected to the serial-parallel converter for master station, an interface circuit providing a connection to a second vehicle-mounted sensor group, and an interface circuit providing a connection to a second electrical load group are bus-connected, the common control circuit being provided with a selection data memory.

In this vehicle-mounted electronic control apparatus, down-serial data transmitted from the serial-parallel converter for master station to the serial-parallel converter for substation include an output/setting packet and a readout request packet. Up-serial data sent back from the serial-parallel converter for substation to the serial-parallel converter for master station include a readout reply packet and a regular reply packet. The output/setting packet includes at least a drive output to the second electrical load group, or write destination address data and write data for transmitting constant setting data to a setting device bus-connected to the serial-parallel converter for substation. The readout request packet includes at least readout destination address data for requesting a transmission of ON/OFF information provided by the second vehicle-mounted sensor group. The readout reply packet includes at least readout data having a preliminarily specified address as reply data to the readout request packet. The regular reply packet includes at least reply data for sending back an input signal from the second vehicle-mounted sensor group in sequential order or in a lump. The selection data memory is a memory containing information of irregular data that are stored in a memory having one or plural specified addresses by the common control circuit, and are sent back from the serial-parallel converter for substation to the serial-parallel converter for master station. The information is sent back to the mastery station serial-parallel converter by the readout reply packet or the regular reply packet.

In the vehicle-mounted electronic control apparatus of above arrangement, the microprocessor can perform mutual exchange of information between the regular down-communication provided by the output/setting packet and the irregular communication provided by the readout request packet. Further the common control circuit can regularly reply information using the regular reply packet, and can store irregular data in the selection data memory based on the determination of the common control circuit to be capable of sending back the irregular data while updating them in sequential order. As a result, an efficient communication can be achieved without normally replying useless information.

BRIEF DESCRIPTION OF THE DRAWINGS

FIGS. 9(*a*), (*b*) and (*c*) are diagrams each showing allocation of regular reply data of a vehicle-mounted electronic control apparatus according to a third preferred embodiment of the invention.

DESCRIPTION OF THE PREFERRED EMBODIMENTS

Embodiment 1.

Figure 1:
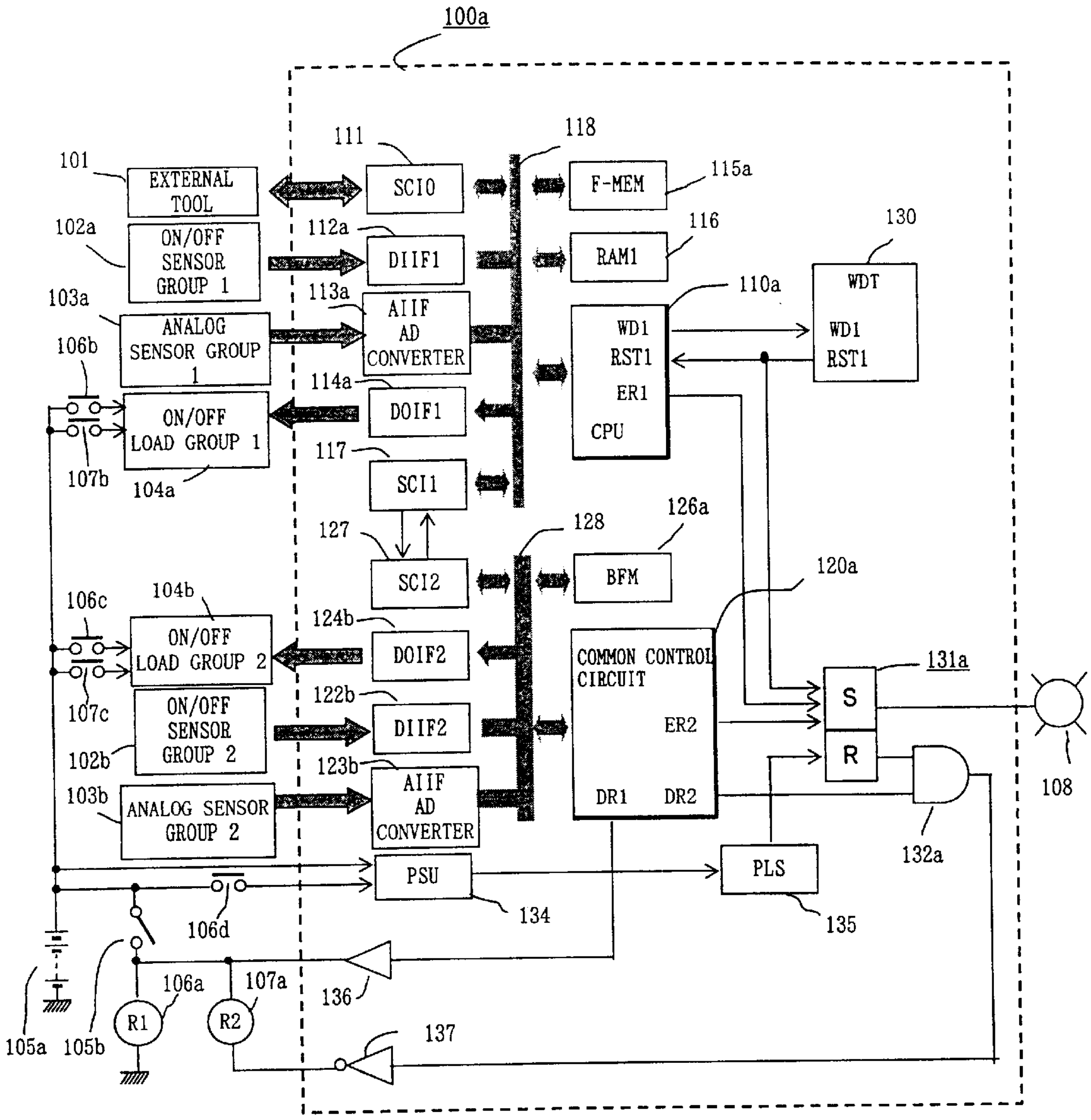
FIG. 1 is a block diagram of a whole vehicle-mounted electronic control apparatus according to a first preferred embodiment of the present invention.
Figure 2:
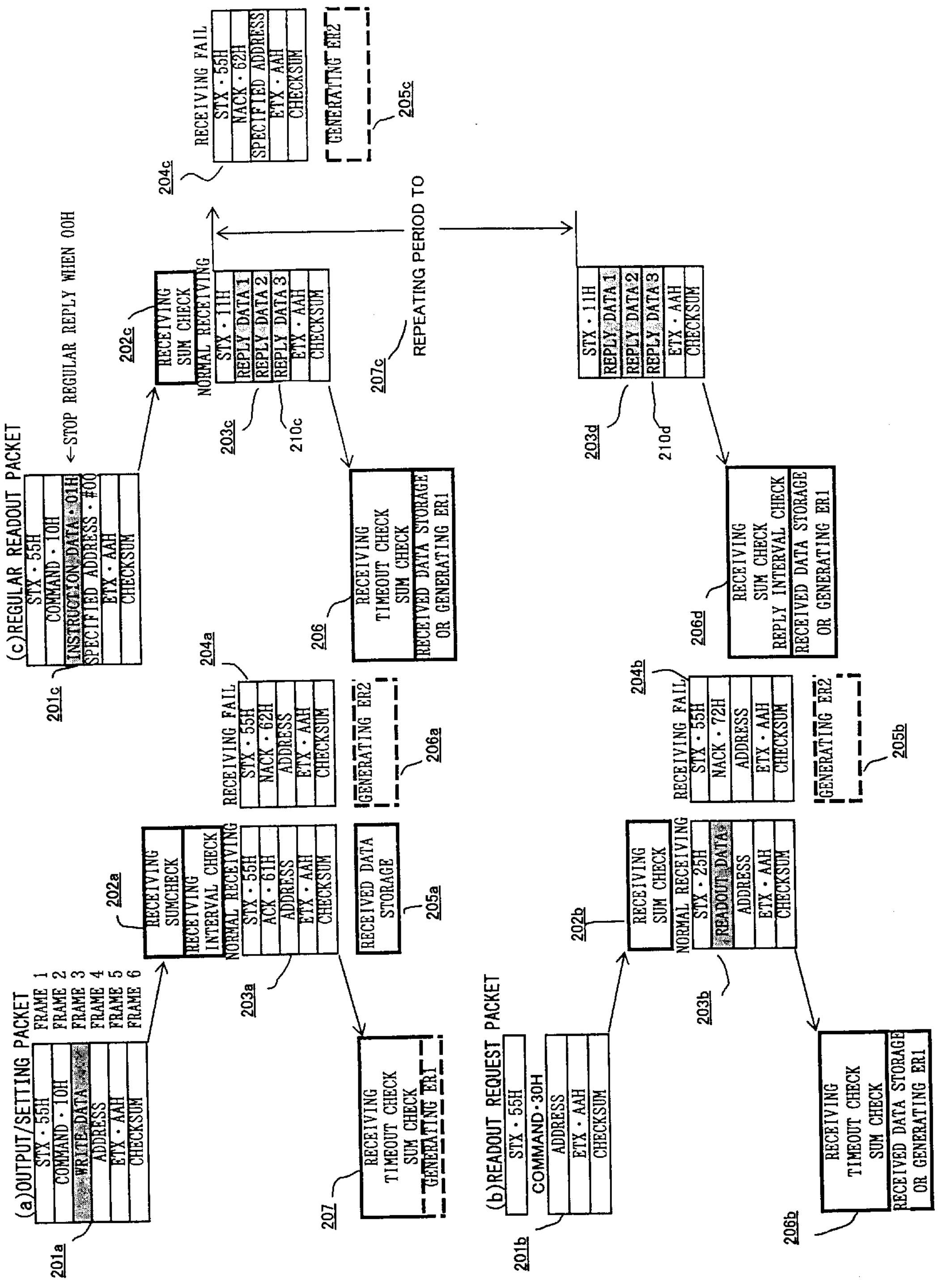
FIGS. 2(*a*, (*b*) and (*c*) are block diagrams each showing a communication packet of the vehicle-mounted electronic control apparatus according to the first embodiment of the invention.
Figure 3:
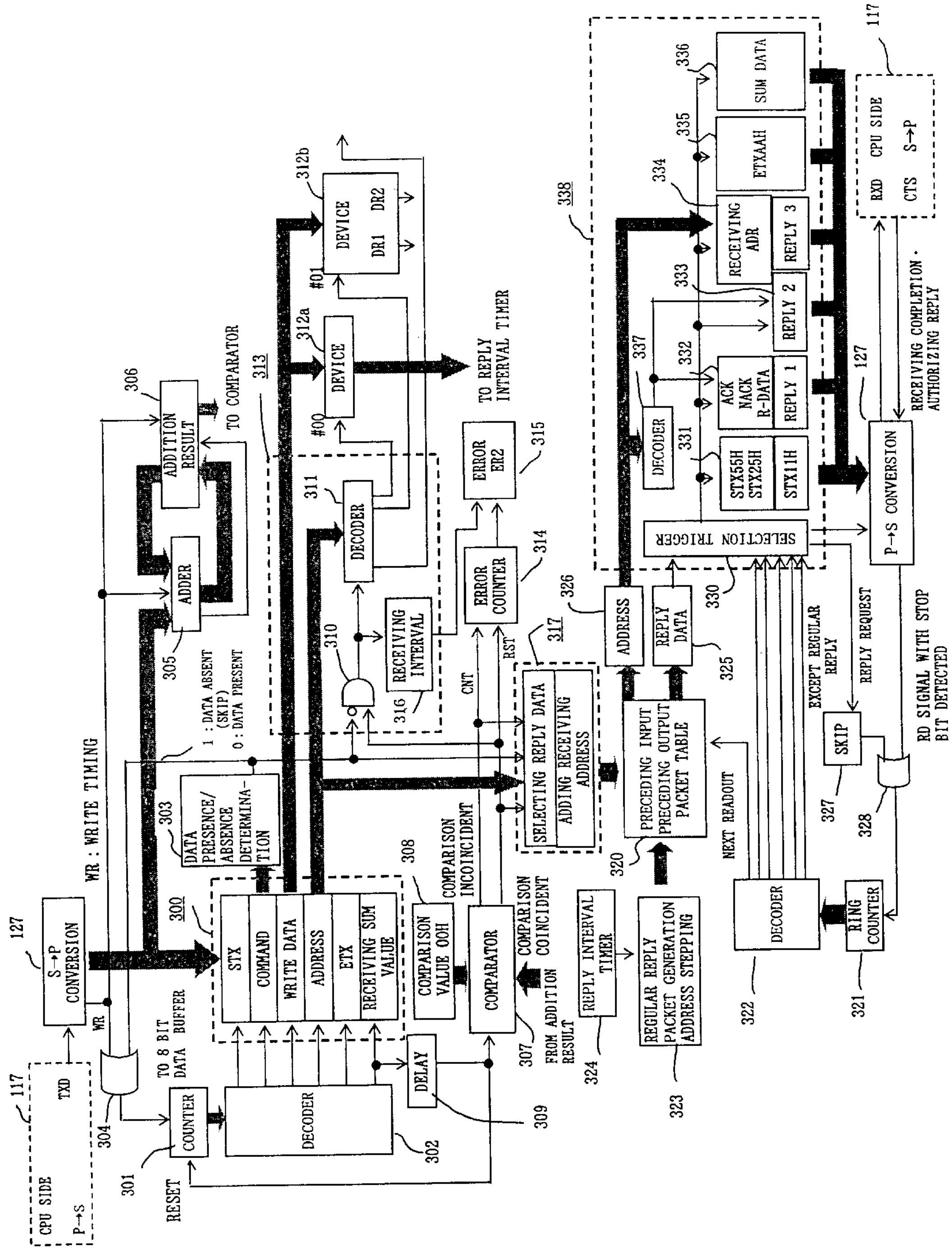
FIG. 3 is a block diagram showing function on the substation side of the vehicle-mounted electronic control apparatus according to the first embodiment of the invention.
Figure 4:
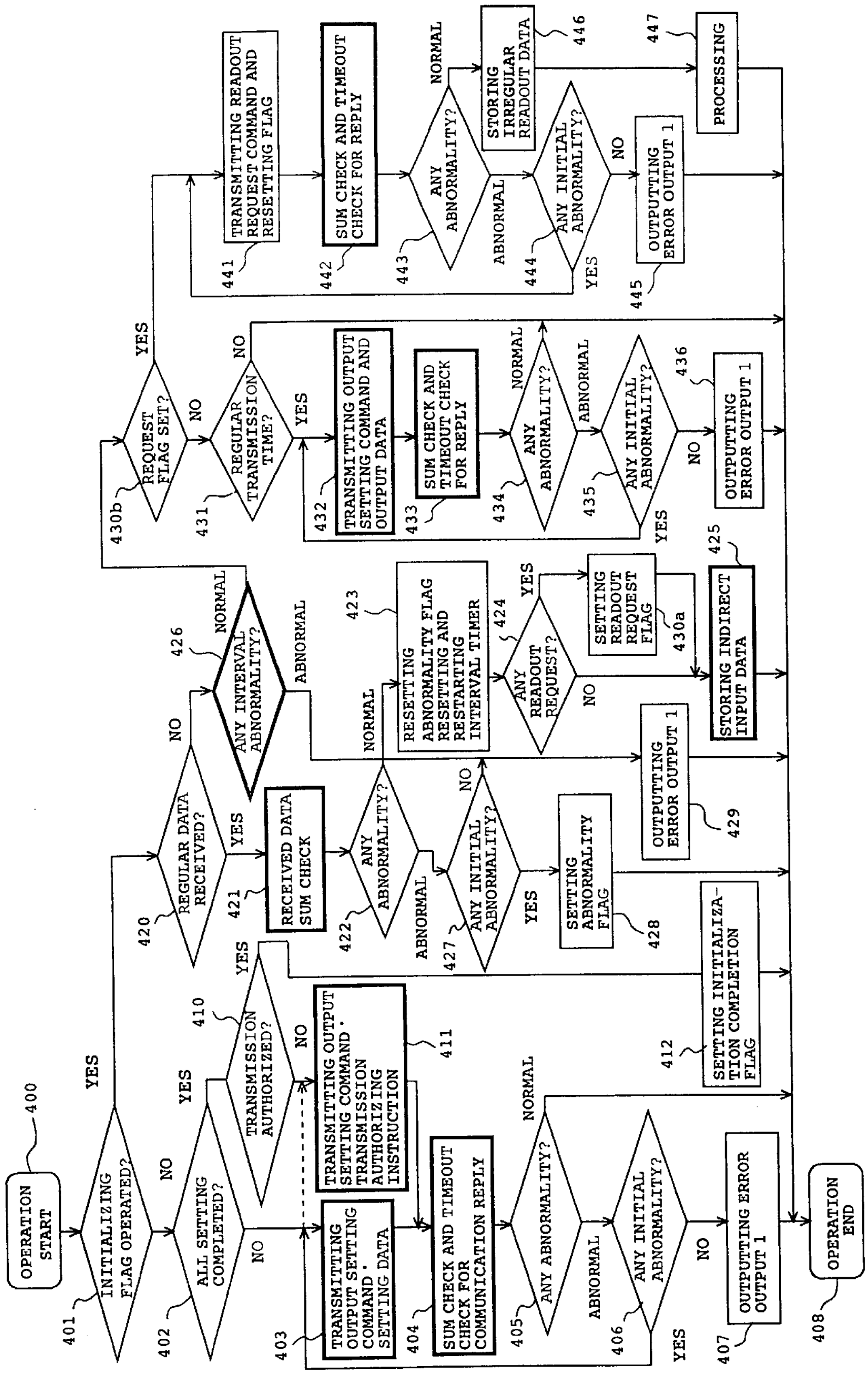
FIG. 4 is a flowchart to explain operation of the vehicle-mounted electronic control apparatus according to the first embodiment of the invention.

FIGS. 1 to 4 are to explain a vehicle-mounted electronic control apparatus according to a first preferred embodiment of the present invention. FIG. 1 is a block diagram explaining a whole constitution, and FIG. 2 is a diagram explaining a packet constitution of a serial communication. FIG. 3 is a block diagram explaining function of a communication control on the side of a substation, and FIG. 4 is a flowchart explaining operation.

Referring to FIG. 1, reference numeral 100*a* designates a vehicle-mounted electronic control apparatus that is constructed of one piece of electronic board, for example. Various sensors, load groups, external tools and the like are connected to the vehicle-mounted electronic control apparatus 100*a*. An external tool 111*a* is connected to the vehicle-mounted electronic control apparatus 100*a* through a connector, not shown, at the time of loading any product or conducting maintenance of the apparatus. The external tool 101*a* thus connected serves in writing a control program or a control constant into a non-volatile program memory 115*a*, described later. A first vehicle-mounted sensor group 102*a* is comprised of sensors such as rotation sensor, crank angle sensor or vehicle speed sensor that operate at a relatively high speed or high frequency and need to directly fetch signals into a microprocessor 110*a* described later.

A second vehicle-mounted sensor group 102*b* is comprised of sensors such as selector switch for detecting a transmission lever position, air-conditioner switch or the like that operate at a relatively low frequency and in which delay in fetching the signal does not much matter.

A first analog sensor group 103*a* is comprised of sensors, which generate an analog signal such as accelerator position sensor, throttle position sensor, airflow sensor, cylinder pressure sensor or the like. Further, a second analog sensor group 103*b* is comprised of analog sensors such as accelerator position sensor and throttle position sensor disposed as a duplex system, coolant temperature sensor, oxygen concentration sensor for exhaust gas, atmospheric pressure sensor or the like.

A first electrical load group 104*a* is comprised of electrical loads for ON/OFF operation such as ignition coil driving output of internal combustion engine or driving output for fuel injection controlling solenoid valve, opening control motor for a throttle valve. Those loads need to be operated at a relatively high frequency and to generate a driving output without delay. A second electrical load group 104*b* is comprised of electrical loads for ON/OFF operation such as driving an electromagnetic clutch for the air-conditioner, outputting a display alarm or the like. Those electrical loads operate at a relatively low frequency, and delay in responding the driving output does not much matter.

Numeral 105*a* designates a vehicle-mounted battery serving as a power supply, and numeral 105*b* designates a power supply switch such as ignition switch. Numeral 106*a* designates a power supply relay including contacts 106*b*, 106*c* and 106*d*. Numeral 107*a* designates a load power supply relay including contacts 107*b* and 107*c*. The power supply relay 106*a* is energized via the power supply switch 105*b* from the vehicle-mounted battery 105*a*. The contacts 106*b* and 106*c* close a power supply circuit to the first and second electrical load groups 104*a* and 104*b* respectively. The contact 106*d* closes a feeding circuit from the vehicle-mounted battery 105*a* to the vehicle-mounted electronic control apparatus 100*a*.

Further, between the vehicle-mounted electronic control apparatus 100*a* and the vehicle-mounted battery 105*a*, there is also provided a direct feeding circuit so that the vehicle-mounted electronic control apparatus 100*a* is sleep-fed even when the power supply switch 105*b* is open. Furthermore, a part of electrical loads of the first and second electrical load groups 104*a* and 104*b* are arranged so as to be connected to the power supply circuit via the contacts 107*b* and 107*c* of the load power supply relay 107*a*. Numeral 108 designates an abnormality alarm display, which is driven by the vehicle-mounted electronic control apparatus 100*a* and located at a position where a driver can visually recognize it with ease.

The vehicle-mounted electronic control apparatus 100*a* is constituted of the following elements. Numeral 110*a* designates a microprocessor of, for example, 32 bits. Numeral 111 designates a serial interface that is serial-connected to the external tool 101. Numeral 112*a* designates an interface circuit for a direct input signal, which is connected to the first vehicle-mounted sensor group 102*a*. Numeral 113*a* designates a multi-channel AD converter connected to the first analog sensor group 103*a*. Numeral 114*a* designates an interface circuit for direct output signal, which is connected to the first electrical load group 104*a*. Numeral 115*a* designates a non-volatile program memory such as flash memory. Numeral 116 designates a RAM for operational processing. Numeral 117 designates a first serial-parallel converter serving as a master station. Numeral 118 designates a data bus. The serial interface 111, the first serial-parallel converter 117, the AD converter 113*a* and the interface circuits 112*a* and 114*a* for the input/output signals, the program memory 115*a*, the RAM 116 and the microprocessor 110*a* are mutually connected through the data bus 118. Thus it is arranged such that an address bus, not shown, or the one specified by a chip select circuit communicates with the microprocessor 110*a*.

Numeral 120*a* designates a common control circuit for primarily providing a communication control. Numeral 122*b* designates an interface circuit for an indirect input signal, which is connected to the second vehicle-mounted sensor group 102*b*. Numeral 123*b* designates a multi-channel AD converter connected to the second analog sensor group 103*b*. Numeral 124*b* designates an interface circuit for an indirect output signal, which is connected to the second electrical load group 104*b*. Numeral 126*a* designates a buffer memory for communication control. Numeral 127 designates a second serial-parallel converter serving as a substation, and which is serial-connected to the first serial-parallel converter 117. Numeral 128 designates a data bus. The second serial-parallel converter 127, the indirect input/output signal interface circuits 122*b* and 124*b*, the AD converter 123*b*, the buffer memory 126*b* and the common control circuit 120*a* are connected mutually through the data bus 128.

Numeral 130 designates a watchdog timer. This watchdog timer 130 monitors a watchdog signal WD1, being a pulse train generated by the microprocessor 110*a*, and generates a reset pulse RST1 when a pulse width of the watchdog signal exceeds a predetermined value to start the microprocessor 110*a* again. In addition, the microprocessor 110*a* is arranged so as to generate a first abnormality detection output ER1 described later. Further, the common control circuit 120*a* is arranged so as to generate a second abnormality detection output ER2, a driving output DR1 relative to the power supply relay 106*a* and a driving output DR2 to the load power supply relay 107*a* as described later.

Numeral 131*a* designates an abnormality storage circuit constituted of a flip-flop circuit provided with a set input S and a reset input R. This abnormality storage circuit 133*a* stores the reset pulse RST1 of the watchdog timer 130 or the operation of the first and second abnormality detection outputs ER1 and ER2, and drives the abnormality alarm display 108. Numeral 132*a* designates drive stop means, being a gate element, numeral 134 designates a power supply unit, and numeral 135 designates a power supply detection circuit. Numeral 136 designates a driving element, and numeral 137 designates an inversion-driving element. The power supply unit 134 is fed from the vehicle-mounted battery 105*a* via the contact 106*d* of the power supply relay 106*a*, and it is also directly fed, thus making up a stable control power supply used in the vehicle-mounted electronic control apparatus 110*a*. The power supply detection circuit 135 detects that the power supply switch 105*b* is closed, and resets the abnormality storage circuit 131*a* to initialize it.

The driving element 136 drives the power supply relay 106*a* by the driving output DR1. The power supply relay 106*a* is arranged so as to continue its operation until the driving output DR1 stops output even if the power supply switch 105*b* is open. The inversion-driving element 137 is to drive the load power supply relay 107*a* by the drive output DR2 via the drive stop means 132*a*. The load power supply relay 107*a* is closed when the drive output DR2 is outputted and the abnormality storage circuit 132*a* does not store any abnormality. Thus, when the power supply relay 106*a* is open, the load power supply relay 107*a* is also open. However, in this arrangement, even if the power supply relay 106*a* is closed, the load power supply relay 107*a* is opened to stop feeding to a part of the vehicle-mounted electrical loads.

FIG. 2(*a*) shows an arrangement of a packet in the case where the indirect output signal or a setting information described later is transmitted from the first serial-parallel converter 117 (hereinafter simply referred to as master station) to the second serial-parallel converter 127 (hereinafter simply referred to as substation). In an output/setting packet 201*a* transmitted from the master station to the substation, a start data 55H, a command 10H, write data, a storage destination address, end data AAH and checksum data are stored in frames 1 to 6. Numeral 202*a* designates abnormality determination means (second mutual monitoring means) in which the common control circuit 120*a* receives a series of data provided by the mentioned output/setting packet 201*a*, and carries out the sum check described later referring to FIG. 3. The abnormality determination means 202*a* also serves as receiving interval abnormality detection means for determining whether or not a receiving interval for the output/setting packet 201*a* goes over a predetermined time.

Numeral 203*a* designates a normal receiving packet that is sent back to the master station when the abnormality determination means 202*a* has determined a normal receiving. The normal receiving packet 203*a* is comprised of five frames of the start data 55H, a recognition data 61H, a storage destination address, the end data AAH and the checksum data. Numeral 204*a* designates a first abnormal receiving packet that is sent back to the master station when the abnormality determination means 202*a* has determined any abnormal receiving. The first abnormal receiving packet 204*a* is comprised of the five frames of the start data 55H, a non-recognition data 62H, the storage destination address, the end data AAH and the checksum data.

Numeral 205*a* designates distribution and storage means for storing the received indirect output signal in a device memory not shown, after sending back the normal receiving packet 203*a*. Numeral 206*a* designates abnormality detection means for generating the second abnormality detection output ER2 in response to the abnormality determination means or receiving interval abnormality detection means 202*a* after sending back the first abnormal receiving packet 204*a*. Actually the second abnormality detection output ER2, however, is generated after completing retransmission confirmation process not shown.

Numeral 207*a* designates first mutual monitoring means for carrying out the sum check when the master station receives the normal receiving packet 203*a* sent back by the substation or the first abnormal receiving packet 204*b*, or a timeout check for a reply response when not receiving the packet 203*a* or 204*a*. In the case where a result of diagnosis is determined abnormal by this first mutual monitoring means 207*a* or the first abnormal receiving packet 204*a* is normally received, the first mutual monitoring means 207*a* transmits again the output/setting packet 201*a*, and generates the first abnormality detection output ER1 in the case where the abnormality still continues.

FIG. 2(*b*) shows a packet in the case that a readout request for various data from the master station to the substation (readout from the substation to the master station) is carried out. For making a readout request, first a readout request packet 201*b* is transmitted from the master station to the substation. The readout request packet 201*b* is comprised of five frames of the start data 55H, a command 30H, a readout destination address, the end data AAH and the checksum data. Numeral 202*b* designates abnormality determination means (second mutual monitoring means) in which the common control circuit 102*a* receives a series of data provided by the readout request packet 201*b*, and conducts the sum check described later referring to FIG. 3.

Numeral 203*b* designates a readout reply packet that is sent back to the master station when the abnormality determination means 202*b* has determined the normal receiving. The readout reply packet 203*b* is comprised of five frames of start data 25H, readout data, a readout destination address, the end data AAH and the checksum data. Numeral 204*b* designates a second abnormal receiving packet that is sent back to the master station when the abnormality determination means 202*b* has determined the abnormal receiving. The second abnormal receiving packet 204*b* is comprised of five frames of the start data 55H, non-recognition data 72H, the readout destination address, the end data AAH and the checksum data. Numeral 205*b* designates abnormality detection means for sending back the second abnormal receiving packet 204*b*, and thereafter generating the second abnormality detection output ER2 in response to the abnormality determination means 202*b*. Actually, however, after completing retransmission confirmation process not shown, the abnormality detection output ER2 is outputted.

Numeral 206*b* designates first mutual monitoring means for carrying out the sum check when the master station receives the readout reply packet 203*b* sent back from the substation or the second abnormal receiving packet 204*b*, or the timeout check for the reply response when not receiving the packet 203*b* or 204*b*. This first mutual monitoring means 206*b* transmits again the readout request packet 201*b* in the case where the result of diagnosis by the first mutual monitoring means is abnormal, or the second abnormal receiving packet 204*b* is normally received. Then the first mutual monitoring means outputs the first abnormality detection output ER1 in the case that the abnormality still continues. Further, when the first mutual monitoring means 206*b* normally receives the readout reply packet 203*b*, the received data normally read out is stored in the RAM 116.

FIG. 2(*c*) shows a frame in the case of transmitting the indirect input signal from the substation to the master station. For transmitting the indirect input signal, first a regular readout packet 201*c* is transmitted from the master station to the substation. The regular readout packet 201*c* is comprised of six frames of the start data 55H, the command 10H, an instruction data 01H, a specified address #00, the end data AAH and the checksum data. The instruction data 01H are data specifying a regular reply period. Numeral 202*c* designates abnormality determination means (second mutual monitoring means) in which the common control circuit 120*a* receives a series of data provided by the regular readout packet 201*c*, and carries out the sum check described later referring to FIG. 3.

Numeral 203*c* designates a regular reply packet that is sent back to the master station when the abnormality determination means 202*c* has determined the normal receiving. This regular reply packet 203*c* is comprised of six frames of start data 11H, reply data 1, reply data 2, reply data 3, the end data AAH and the checksum data. Numeral 204*c* designates a first abnormal receiving packet that is sent back to the master station when the abnormality determination means 202*c* has determined the abnormal receiving. The first abnormal receiving packet 204*c* is comprised of five frames of the start data 55H, the non-recognition data 62H, the specified address #00, the end data AAH and the checksum data. Numeral 205*c* designates abnormality detection means for generating the second abnormality detection output ER2 in response to the abnormality determination means 202*c*. Actually, however, after completing retransmission confirmation process, the abnormality detection output ER2 is outputted.

Numeral 206*c* designates first mutual monitoring means for carrying out the sum check when the master station receives the regular reply packet 203*c* sent back from the substation or the first abnormal receiving packet 204*c*, or the timeout check for the reply response when not receiving the packet 203*c* or 204*c*. In the case where the diagnosis result of this first mutual monitoring means 206*c* is abnormal or the first abnormal receiving packet 204*c* is normally received, the first mutual monitoring means 206*c* waits again for receiving the regular reply packet 203*c*. Then the first mutual monitoring means outputs the first abnormality detection output ER1 in the case that the abnormality still continues. Additionally, in the case where the first mutual monitoring means 206*c* determines that the regular reply packet 203*c* is normally received, the normally read-out reply data 1, reply data 2 and reply data 3 are stored in a memory of a predetermined address.

Low-order 4 bits of the reply data 3 serve as address data specifying a storage destination for the reply data. For example, when the address is 0, the ON/OFF state of second vehicle-mounted sensor group 102*b* of not more than 16 points is sent back by the reply data 1 and the reply data 2. When the address is 1 to 15, a digital conversion value of the second analog sensor group 103*b* of not more than 15 points/16 bits is sent back by the reply data 1 (high-order 8 bits) and the reply data 2 (low-order 8 bits). Furthermore, high-order 4 bits of the reply data 3 are status information as described later. The instruction data 01H of the regular readout packet 201*c* is to specify an interval of a repeating period T0 indicated by numeral 207*c*. Numeral 203*d* shows a regular reply packet that is repeated from the regular reply packet 203*c* at an interval of a period T0. However, in the case where the instruction data of the regular readout packet 201*c* comes to be, for example, 00H, this regular reply is stopped.

Numeral 206*d* designates first mutual monitoring means for carrying out the sum check when the master station receives the regular reply packet 203*d* sent back from the substation. When the result of diagnosis by this first mutual monitoring means is abnormal, the first mutual monitoring means 206*d* waits again for receiving the regular reply packet 203*c*. The first mutual monitoring means 206*d* outputs the first abnormality detection output ER1 in the case of that the abnormality still continues. Furthermore, in the case where the first mutual monitoring means 206*d* diagnoses that the regular reply packet 203*d* is normally received, the normally read-out reply data 1, reply data 2 and reply data 3 are stored in a memory of a predetermined address. In addition, the first mutual monitoring means 206*d* contains therein reply interval abnormality detection means. This detection means measures an interval from the last-time regular reply to this-time regular reply, and outputs the first abnormality detection output ER1 in the case that the interval thereof goes over a predetermined time.

In the block diagram of FIG. 3 showing communication control on the side of the substation, serial data transmitted from the first serial-parallel converter 117 serving as a master station to the second serial-parallel converter 127 serving as a substation are constituted as hereinafter described. The serial data are composed of altogether 11 bits of data, i.e., net data of 8 bits per frame to which a start bit, a stop bit and a parity bit are added at the first serial-parallel converter 117 on the transmission side. A parity check is conducted on the receiving side, and when any abnormality is detected, the received data are thrown away. On the contrary, when no abnormality is detected, only the net data are extracted and sequentially stored in first storage means 300 frame by frame as described later.

Numeral 300 designates first storage means comprised of 6 bites of buffer memory. Numeral 301 designates a counter for counting number of the receiving frames. Numeral 302 designates a decoder with respect to a count output from the counter 301. Numeral 303 designates a command decoder in which output logic is 0 when a receiving command is an output/setting command 10H, and the output logic is 1 when the receiving command is a readout request command 30H. Numeral 304 designates a logical OR element that synthesizes a write timing signal WR and an output from the mentioned command decoder 303. The mentioned write timing signal WR comes to be logic 1 each time the second serial-parallel converter 127 on the receiving side detects a stop bit locating at the tenth bit from detecting the start bit. Then the counter 301 is driven by the output from this logical sum element 304.

The decoder 302 is to assign a series of received data in sequential order to the six buffer memories in the mentioned first storage means 300. However, when receiving the readout request packet 201*b* (see FIG. 2) not accompanied by the write data, the command decoder 303 generates a logical output 1 and drives the counter 301 in excess just by one count, skipping a series of storage destinations of the receiving frame, to store the readout request packet 201*b* in the first storage means 300. The write data at the third bite in the first storage means 300 is to be a buffer memory for storing when the receiving packet is the output/setting packet 201*a*.

Numeral 305 designates an adder, and numeral 306 designates an addition result register. The adder 305 is arranged so as to accumulate and add the received data and contents of the mentioned addition result register 306 in synchronization with the write timing signal WR, and to store again the accumulated and added content in the addition result register 306. Numeral 307 designates comparison determination means for comparing contents of the addition result register 306 with those of a comparison constant register 308. Numeral 309 designates a delay timer for implementing the mentioned comparative operation after receiving a final frame and resetting the mentioned counter 301, and content of the comparison constant register 308 is 00H.

Numeral 310 designates a gate element in which the output logic comes to be 1 when the output logic from the command decoder 303 is 0 (when the received data are the output/setting command) and moreover the output from the abnormality determination means 307 is comparative coincidence (normal). Numeral 311 designates an address decoder that operates, when the output logic from the mentioned gate element is 1, to decode the write destination address stored in the first storage means 300. Numerals 312*a*, 312*b* . . . designate device memories that are selected alternatively depending upon the output from the address decoder 311. Then the write data stored in the mentioned first storage means 300 is transferred to and written in the selected device memory.

Numeral 313 designates distribution storage means comprised of the gate element 310 and the address decoder 311. In addition, a value of the repeating period T0 of the regular reply, the value being instructed in the mentioned regular readout packet 201*c* (see FIG. 2), is stored in the device memory 312 whose address is 0. Totally 8 points of ON/OFF output information, such as the mentioned power supply relay driving output DR1, the load power supply relay driving output DR2, are stored in the device memory 312*b* whose address is 1. Numeral 314 designates an error counter arranged so as to count and add number of times of the comparative disagreement output from the abnormality determination means 307, and generate a second abnormality detection output 315 when a value obtained by counting and adding goes over a predetermined value and, at the same time, reset a count and addition value 0 in response to a comparative coincidence output from the abnormality determination means 307. Numeral 316 designates receiving interval abnormality detection means for clocking a time interval of the gate element 310 that generates the logical output 1, and generating the second abnormality detection output 315 when the receiving time interval goes over a predetermined value.

Numeral 317 designates reply packet generation means for selecting which type of packet must be sent back among the reply packets 203*a* and 204*a* (204*c*), 203*d* and 204*d*, described in FIG. 2, depending on whether or not the comparison result at the mentioned abnormality determination means 307 is coincident and whether the output from the command decoder 303 is logic 0 (output/setting command) or logic 1 (readout request command). The address information stored in the first storage means 300 is added to the information, which is generated by the reply packet generation means 317, besides the reply data, e.g., ACK or NACK. Further, it is arranged such that the request command 30H itself (see FIG. 2*b*) may be selected as a provisional reply data among the mentioned reply data when the readout request command is normally received. Furthermore, in the case where any command stored in the first storage means 300 is indefinite due to any abnormality or any address is unclear, it is possible to use such alternative means as sending back a non-recognition data (for example, 82H) irrelevant to the command content (output/setting or readout request) or reply with an improbable and specified address.

Numeral 320 designates second storage means in which data, being a paired reply data and address data that are selected and synthesized by the reply packet generation means 317, are stored in order, and this second storage means 320 reads out preceding input data in a preceding manner. Numeral 321 designates a ring counter for counting number of reply frames and circulating by each six counts. Numeral 322 designates a decoder of the output counted from the ring counter 321. Numeral 323 designates regular reply packet generation means. Numeral 324 designates a regular reply interval timer. This regular reply interval timer 324 generates a trigger signal with intervals of a predetermined time based on the instruction data stored in the device memory 312*a* to store the provisional reply data and the address data specified at the regular reply packet generation means 323, in the second storage means 320. In addition, a specified code number for identifying the regular reply packet, for example, FFH, represents the mentioned provisional reply data. The address data are arranged so as to sequentially update and repeat an address of the data to be regularly sent back.

Numeral 325 designates reply data read out from the second storage means 320. Numeral 326 designates address data read out from the second storage means 320, and become a pair with the reply data 325. Numeral 327 designates a skip signal generation circuit operating when the reply data 325 are not the regular reply data. Numeral 328 designates OR element for synthesizing a readout signal RD generated by the second serial-parallel converter 127 (substation) and a skip signal generated by the skip signal generation circuit 327 to drive the counter 321. The second serial-parallel converter 127 adds the start bit, the parity bit and the stop bit to the reply data, sending back the resultant thereof to the first serial-parallel converter 117 (master station), and generates the mentioned readout signal RD upon detecting the stop bit of the reply frame. In addition, the reply from the second serial-parallel converter 127 to the first serial-parallel converter 117 is started upon the first serial-parallel converter 117 transmits a receiving completion signal, and the second serial-parallel converter 127 receives the receiving completion signal.

Numeral 330 designates frame selection means for generating a selection trigger signal in response to a content of the reply data 325 and an output from the decoder 322, selecting the first to sixth reply frames 331 to 336 in sequential order, and determining the content of each frame as well. For example, supposing that the content of the reply data 325 is ACK•61H in the normal receiving packet 203*a*, shown in FIG. 2, the content of the first frame 331 is STX•55H, the content of the second frame 332 is ACK•61H, the third frame 333 is skipped and not sent back, the content of the fourth frame 334 is the address data 326, the content of the fifth frame 335 is ETX•AAH, and the content of the sixth frame 336 is a binary addition value of the first frame 331 through the fifth frame 335.

Supposing that the content of the reply data 325 is, for example, the provisional data 30H in the readout reply packet 203*b*, shown in FIG. 2, the content of the first frame 331 is STX•25H, the content of the second frame 332 is the readout data, the third frame 333 is skipped and not sent back, the content of the fourth frame 334 is the address data 326, the content of the fifth frame 335 is ETX•AAH, and the content of the sixth frame 336 is a binary addition value of the first frame 331 through the fifth frame 335. The readout data of the mentioned second frame 332 is a content of a device of an address selected by means of an address decoder 337.

Supposing that the content of the reply data 325 is a specific code number FFH for specifying the regular reply packet 203*c*, shown in FIG. 2, the content of the first frame 331 is STX•11H, the content of the second frame 332 is the reply data 1, the content of the third frame 333 is the reply data 2, the content of the fourth frame 334 is the reply data 3, the content of the fifth frame 335 is ETX•AAH, and the content of the sixth frame 336 is a binary addition value of the first frame 331 through the fifth frame 335. Specific examples of the mentioned reply data 1 to the reply data 3 will be described in detail later in the second preferred embodiment. Numeral 338 designates reply packet composing means comprised of the mentioned frame selection means 320, the first frame 331 to the sixth frame 336, and the address decoder 337. The reply frame composed by the reply packet composing means 338 is to be sequentially sent back from the second serial-parallel converter 127 (substation) to the first serial-parallel converter 117 (master station).

In addition, the frame selection means 330 makes a reply request against the second serial-parallel converter 127 every time data of the first frame 331 through the sixth frame 336 are ready. Upon receipt of the receiving completion signal from the first serial-parallel converter 117, the frame selection means 330 replies each frame in order. Further, supposing that the reply data 325 are data other than any special code number for the purpose of regular reply, the frame selection means 330 is arranged so as to act on the skip signal generation circuit 327, and skip the third frame 333. Additionally, the mentioned decoder 322 is arranged so as to select a reply frame number in response to a current value of the mentioned ring counter 321, and to generate a readout instruction for the next reply data and address data to the mentioned storage means 320 upon completing the sending back of the series of frames.

The communication operation of the vehicle-mounted electronic control apparatus of above arrangement according to the first embodiment of this invention is now described with reference to a flowchart shown in FIG. 4. The regularly activated microprocessor 110*a* starts operation in step 400, and whether or not initializing completion flag is set is determined in step 401. This initializing flag is set in step 412 as described later. When this initializing completion flag is not set, the program proceeds to step 402, in which it is determined whether or not an initial setting to various setting registers, not shown, has completed. Supposing that the initial setting has not completed, a setting constant is transmitted to a setting register, not shown, having the first address using the output/setting packet 201*a* in FIG. 2.

In a subsequent step 404, the sum check and the timeout check on the reply response of the normal receiving packet 203*a* (ACK) or the first abnormal receiving packet 204*a* (NACK) in FIG. 2, are carried out. Upon obtaining the reply response, the sum check for the received data is immediately carried out, and the program proceeds to next step 405. When, however, the reply response is not obtained even after standby for a predetermined time, the timeout determination is conducted and thereafter the program proceeds to step 405. In step 405, it is determined whether or not the sum-check error or the timeout error occurs in step 404, and whether the received data is ACK or NACK. When any abnormality is determined or NACK receiving is determined, it is further determined in step 406 whether or not the abnormality is an initial abnormality. When the initial abnormality is determined in step 406, the program returns to step 403 to conduct the transmission of the setting data again. Where as, when it is determined that the abnormality is continuous but not the initial abnormality, the first abnormality detection output ER1 is outputted in step 407.

When it is determined normal in step 405, as well as after the ER1 is outputted in step 407, the operation ends in step 408. Then the program returns to step 400 and is activated again thus the control operation is repeated. In the case where the microprocessor 110*a* is activated again in step 400, and when initialization flag by step 412, described later, has not been set yet and the constant setting for all the setting registers has not completed, then the steps 401, 402, 430, 404 and 405 are repeated to sequentially carry out the constant setting for the rest of the setting registers. Repeating the above-described operations, when it is determined in step 402 that the initial setting operation for the whole setting registers has completed, the program proceeds to step 410.

Instep 410, whether or not the regular readout packet 201*c*, shown in FIG. 2, is transmitted, is determined. When it has not been transmitted yet, the program proceeds to step 411, in which the regular readout packet 201*c* is transmitted. Thereafter, the program proceeds to step 404, 405, 407 and 408, and operation thereof is similar to that implemented in the case of step 403. Note that step 406 is for the purpose of determining the initial abnormality, and the program proceeds to step 411 when carrying out a retransmission process. In the case where it is determined in the above-described step 410 that the regular readout packet 201*c* has been already transmitted, the program proceeds to step 412, in which the initialization completion flag is set, and subsequently the program proceeds to step 408 for the operation end.

Through the operations as described above, the initial setting operation to the whole setting registers, not shown, has completed. After the initialization completion flag is set, the program proceeds from the step 400 of the operation start via step 401 to step 420. In step 420, it is determined whether or not the master station receives the regular reply packet 203*d* in FIG. 2 (at the first time, it is the regular reply packet 203*c* or the first abnormal receiving packet 204*c*). When it is determined that the mentioned packet is received, the program proceeds to step 421, in which the sum check for the received data is carried out. Subsequently, it is determined in step 422 whether or not there is any abnormality in the received data. In the case where the received data is normal herein, the program proceeds to step 423, resets an abnormality flag, which is set in step 428 as described later, as well as resets the reply interval timer 324 to start it again.

In subsequent step 424, it is determined whether or not readout request information, described later, is contained in the reply data 3 of the regular reply packets 203*c* and 203*d*. Step 430*a* sets the readout request flag when it is determined that the readout request is present. Step 425 operates when it is determined in step 424 that the readout request is absent or following step 430*a*, and stores in the RAM 116 contents of the reply data 1 and reply data 2 of the regular reply packets 203*c* and 203*d*. When the determination in step 420 is NO, the program proceeds to step 426, in which it is determined whether or not the reply interval timer started in step 423 has passes over a predetermined time. That is, this step 423 is reply interval abnormality determination means for determining whether or not the timer has passed over a predetermined time equivalent to the repeating period T0 in FIG. 2.

In the case where any abnormality is determined in step 422, the program proceeds to step 427, in which it is further determined whether or not the abnormality is the initial abnormality. When determined it is the initial abnormality, the program proceeds to step 428, in which the abnormality flag is set. The abnormality flag, which is set in step 428, is reset in the mentioned step 423. In addition, the mentioned step 427 determines whether or not it is the initial abnormality depending on whether or not the abnormality flag is set. The program proceeds to step 429 in the case where step 426 determines the abnormality, or step 427 determines that it is not the initial abnormality. The first abnormality detection output ER1 is outputted in step 429. After outputting it, the program proceeds to step 408 for ending the operation to activate again step 400 for starting the operation.

When any normality is determined in step 426, the program proceeds to step 430*b*, in which it is determined whether or not the readout request flag is set in step 430*a*. In the case of not setting, the program proceeds to step 431, in which it is determined whether or not it is a regular transmission time for a drive output signal to the second electrical load group 104*b*. When the determination is YES in step 431, the program proceeds to step 432, in which the output information is transmitted to a device memory within the indirect output signal interface circuit 124*b* shown in FIG. 1 using the output/setting packet 201*a* shown in FIG. 2. Subsequently, the program proceeds to step 433, in which conducted are the sum check and the timeout check for the response reply data, being the normal receiving packet 203*a* (ACK) or the first abnormal receiving packet 204*a* (NACK) in FIG. 2.

In this step 433, the sum check for the received data is carried out immediately upon obtaining the reply response, and the program proceeds to step 434. However, when any reply response is not obtained even after standby for a predetermined time, the timeout determination is conducted, thereafter the program proceeds to step 434. In this step 434, it is determined whether or not the sum-check error or the timeout error occurs in step 433, and whether the received data are ACK or NACK. When the abnormality determination or the NACK receiving determination is conducted, the program proceeds to step 435, in which it is determined whether or not the abnormality in step 434 is the initial abnormality. When the initial abnormality is determined in the foregoing step 435, the program returns to step 432, in which the transmission of the output data is conducted again. On the contrary, when it is determined not the initial abnormality, this means that the abnormality continues and therefore the first abnormality detection output ER1 is outputted in step 436.

In addition, when it is determined not the regular transmission time in step 431, or when the normality is determined in step 434, and after ER1 is outputted in step 436, the program proceeds to step 408 for ending the operation. In the case where it is YES in step 430*b*, the program proceeds to step 441, in which the readout request packet 201*b* in FIG. 2 is transmitted, and the readout request flag set in step 430*a* is reset as well. Subsequently, the program proceeds to step 442, in which carried out are the sum check and the timeout check for the reply response data, being the readout reply packet 203*b* or the second abnormal receiving packet 204*b* (NACK) in FIG. 2. In the mentioned step 442, the sum check for the received data is conducted immediately after obtaining the reply response, and then the program proceeds to step 443. When there is no reply response also after standby for a predetermined time, the timeout determination is conducted, and thereafter the program proceeds to step 443.

In step 443, it is determined whether or not the sum-check error or the timeout error occurs in step 442, and whether the received data is normal or NACK. When any abnormality is determined or the NACK receive determination is conducted, the program proceeds to step 444, in which it is determined whether or not the abnormality is the initial abnormality. When the initial abnormality is determined in this step 444, the program returns to step 441, in which the readout request packet 201*b* is transmitted again. When it is determined not the initial abnormality in step 444, the program proceeds to step 445, in which the first abnormality detection output ER1 is outputted. In the case where the normality is determined in step 443, the program proceeds to step 446, in which the readout information (irregular readout data) is stored in the RAM 116. Step 447 is a processing step following step 446, which will be described in detail according to a second preferred embodiment.

The foregoing operations can be summarized as follows. A block from step 401 to step 412 is for conducting the initial setting at the time of starting the operation. As an example of the initial setting information, there is a filter constant, which will be described in the second embodiment. A block from step 420 to step 429 is for regularly transmitting to the microprocessor 110*a* the indirect input signal from the second vehicle-mounted sensor group 102*b* or the second analog sensor group 103*b*. This regular transmission is operated upon authorized by the microprocessor 110*a* in step 441.

Furthermore, a block from step 430*b* to step 436 is a series of steps in which an indirect output signal is regularly transmitted from the microprocessor 110*a* to the second electrical load group 104*b*. A block from step 441 to step 447 is a series of steps for processing the irregular reply data sent back to the microprocessor 110*a* based on the readout request from the microprocessor 110*a*. When it is intended that the irregular data be voluntarily transmitted from the substation, the microprocessor 110*a* comes to conduct a readout request by setting the flag for the readout request in step 430*a*.

The operations mentioned above will be summarized as follows referring to the block diagram of FIG. 1 showing the whole constitution, the diagram of FIG. 2 showing the constitution of packet, and the block diagram of FIG. 3 showing communication control on the substation side. That is, the microprocessor 110*a* in FIG. 1 uses signals of the first and second vehicle-mounted sensor groups 102*a* and 102*b*, and the first and second analog sensor groups 103*a* and 103*b*, as the input signals. Further, the microprocessor 110*a* controls the first and second electrical load groups 104*a* and 104*b* based on the control program and the control constant stored in the non-volatile program memory 115*a*. On the other hand, the second vehicle-mounted sensor group 102*b*, the second analog sensor group 103*b* and the second electrical load group 104*b* make serial-communication with the microprocessor 110*a* indirectly via the first serial-parallel converter 117 (master station) and the second serial-parallel converter 127 (substation). In addition, any analog output is not illustrated in FIG. 1, however, it is preferable that a DA converter for the purpose of indicating meter be provided as an indirect output when required.

Electrical loads, of which feeding is interrupted by means of the load power supply relay 107*a* when occurring any abnormality, are, for example, a motor for conducting an opening control of an air-supplying throttle valve and the like. Electrical loads, of which driving is desirably stopped although not necessary to carry out the power supply interruption, are, for example, apparatus of auxiliary function regarding safety such as vehicle side monitoring control apparatus, automatic manipulation control apparatus and the like. However, note that ignition control, fuel injection control and other control of the internal combustion engine is arranged so as to be capable of operating by whatever means possible from the viewpoint of safe traveling, evacuation traveling, etc.

Accordingly, in the case where the microprocessor 110*a* runs away due to noise, malfunction or the like, the microprocessor 110*a* is automatically started again by means of the reset pulse RST1. However, when generating the reset pulse RST1, the abnormality storage circuit 131*a* stores the pulse generation, and a part of electrical loads such as the load power supply relay 107*a* are stopped their driving by the drive stop means 132*a*. Alternatively, it is also preferable that, in order to cope with generation of the reset pulse RST1 plural times, a counter circuit is additionally provided to store the generation in the abnormality storage circuit 131*a* so that, only in the case of the abnormality signal continuing, a part of the electrical loads may be drive-stopped.

Referring to FIG. 3, there is generally a large amount of information in the up-communication from the substation to the master station except for an initial setting time of starting the operation, and moreover a reply response to down-communication is added thereto, and therefore any delay is prone to occur in the up-communication. The second storage means 320 for reading out the preceding input data in a preceding manner is provided for the purpose of avoiding a confliction with the down-communication by making a queue (waiting line) of the information not having been sent back yet, and sequentially sending back them to meet the occurrence of such a delay. In addition, at the time of replying, the latest information at that point of time is added to the existing information by the reply packet composing means 338, and the resultant information is sent back.

It is preferable that the reply data by the regular reply packet generation means 323 may be preferentially written at a head portion of the second storage means 320. In the case where the reply data are sequentially written at a rear part as is done in this embodiment, an actual regular reply time may be delayed in the case where there are much delayed standby data. In this case, when there is abnormal delay, the abnormality is detected by the reply interval abnormality determination means 426 shown in FIG. 4, and the first abnormality detection output ER1 comes to operate, thereby causing the abnormality storage circuit 131*a* to operate. Further, it is arranged such that, at the time of starting the operation in which there are a large amount of data in the down-communication, the regular reply from the substation is prohibited, the microprocessor 110*a* transmits the initial setting data in a concentrated manner, and the readout of the indirect input information is conducted timely using the readout request packet. The mentioned arrangement can ease the delay at the second storage means 320.

As a result of the arrangement and operation as described above, in the vehicle-mounted electronic control apparatus according to the first embodiment of this invention, even if there is any inequality or unbalance between data amount of the down-communication from the master station to the substation and that of the up-communication from the substation to the master station, the unbalanced state changes depending on the operation state of the microprocessor. Even if any delay occurs in the communication from one side, such delay does not affect on the communication from the other side. For example, even if an up-reply data is temporarily delayed, the down-transmission can continue, e.g., by the second storage means that conducts the preceding input/preceding output operation, while the delayed reply data are added with the latest readout data by the reply packet composing means, and sent back. In this manner, freedom in terms of timing for the transmit/receiving is improved, and a serial communication can be efficiently carried out.

Embodiment 2.

Figure 5:
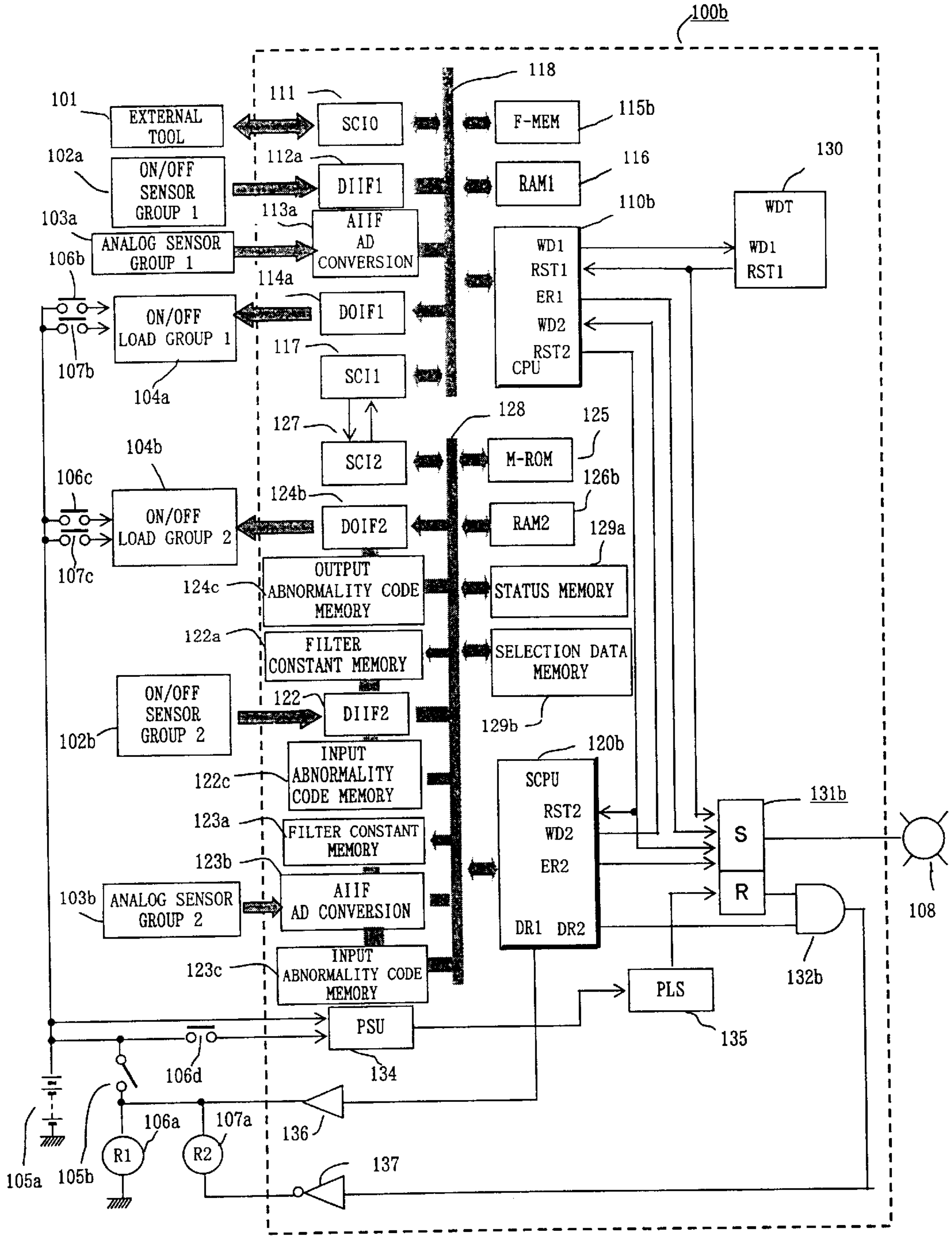
FIG. 5 is a block diagram of a whole vehicle-mounted electronic control apparatus according to a second preferred embodiment of the invention.
Figure 6:
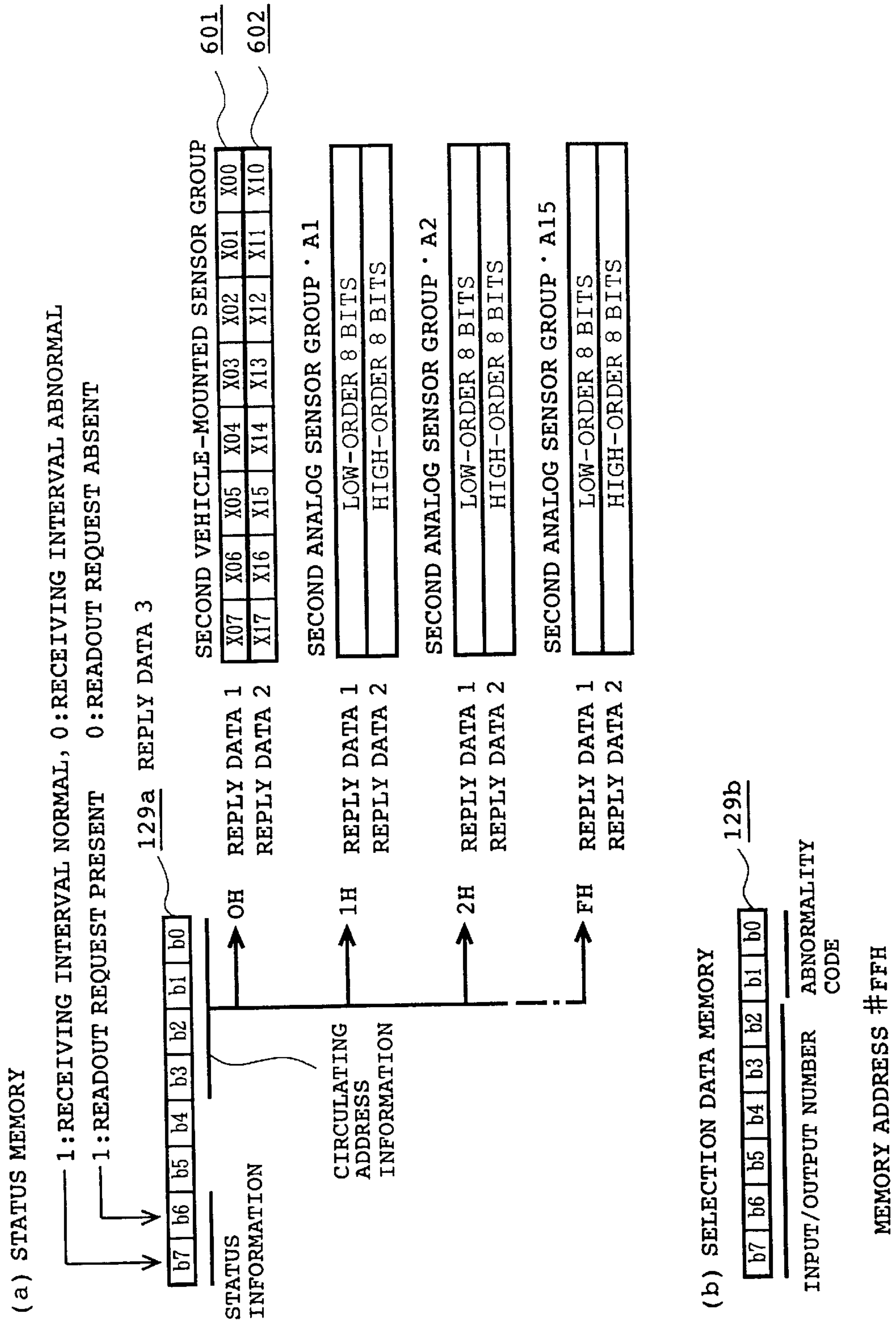
FIGS. 6(*a*) and (*b*) are diagrams each showing allocation of regular reply data of the vehicle-mounted electronic control apparatus according to the second embodiment of this invention.
Figure 7:
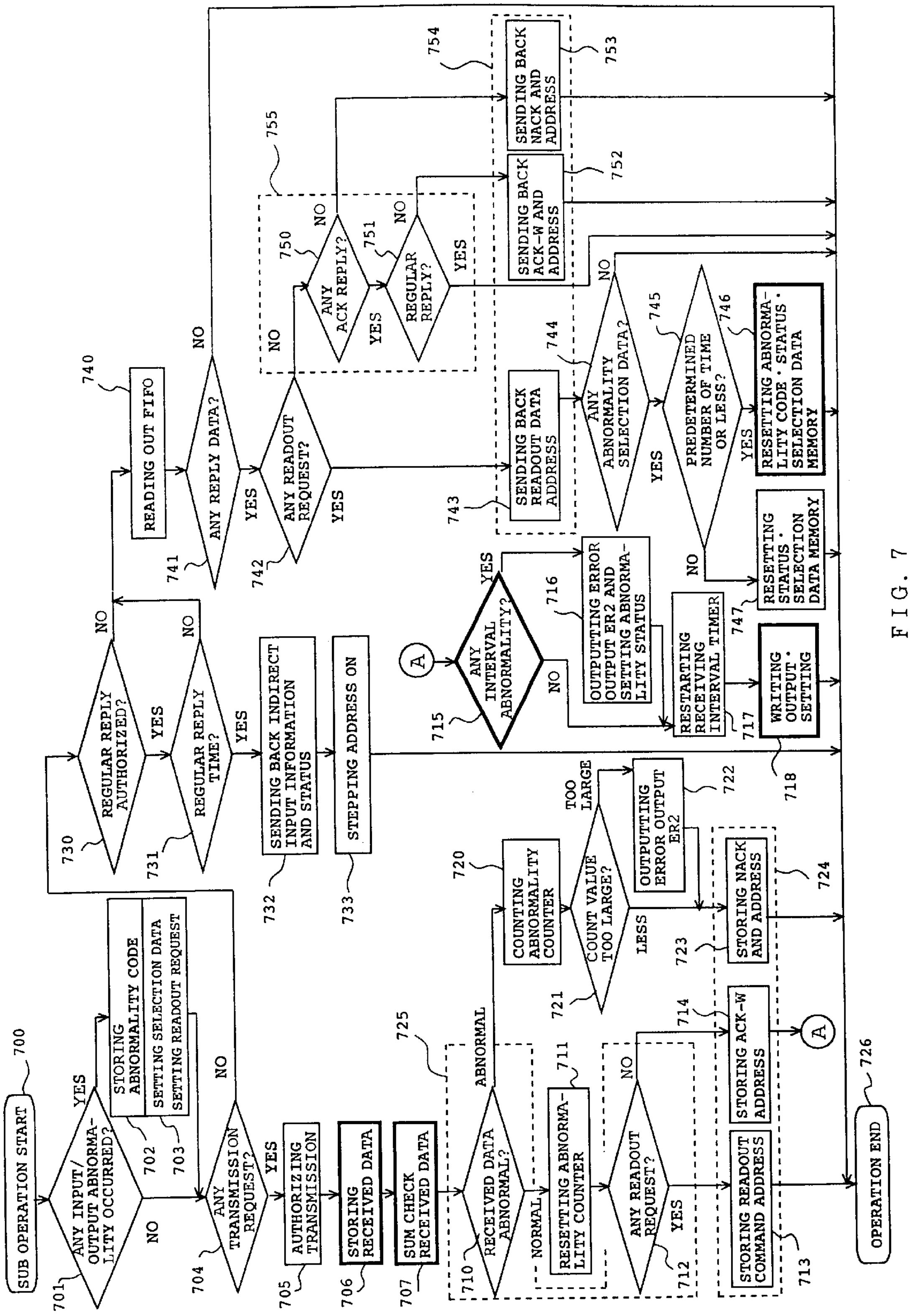
FIG. 7 is a flowchart to explain operation of the vehicle-mounted electronic control apparatus according to the second embodiment of the invention.
Figure 8:
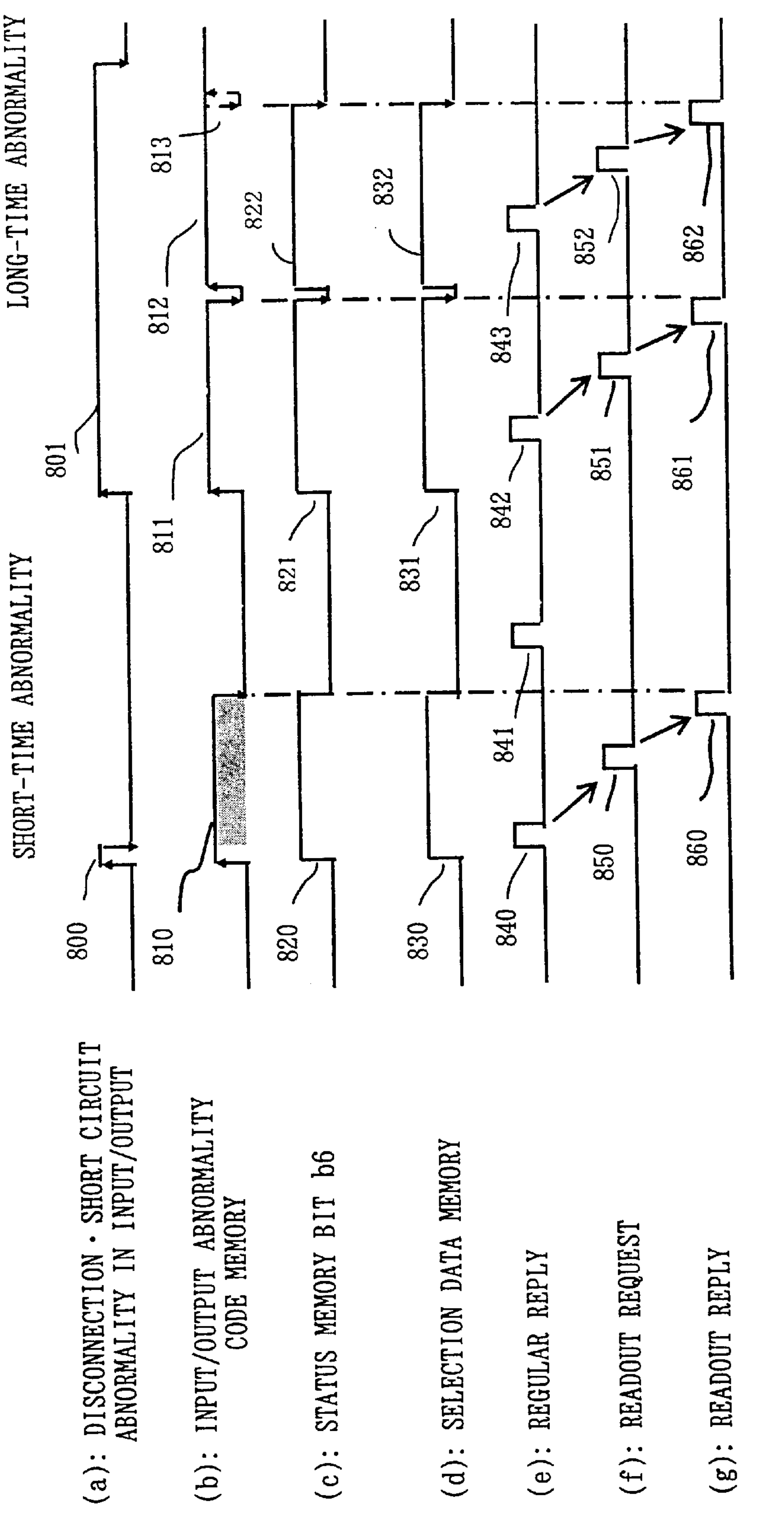
FIG. 8 is a time chart to explain operation of the vehicle-mounted electronic control apparatus according to the second embodiment of the invention.

FIGS. 5 to 8 show a vehicle-mounted electronic control apparatus according to a second preferred embodiment of this invention. FIG. 5 is a block diagram to explain a whole constitution of the vehicle-mounted electronic control apparatus. FIGS. 6(*a*), (*b*) and (*c*) are diagrams each showing allocation of regular reply. FIG. 7 is a flowchart to explain operation of an auxiliary microprocessor. FIG. 8 is a time chart to explain. In the block diagram of FIG. 5, the same reference numerals as in FIG. 1 showing the foregoing first embodiment are designated to the equivalent parts. Referring to FIG. 5, differences from FIG. 1 are mainly described below.

In FIG. 5, reference numeral 100*b* designates a vehicle-mounted electronic control apparatus made of, for example, a piece of electronic board. Mounted on the electronic board are a microprocessor 10*b*, a non-volatile program memory 115*b* such as flash memory, an auxiliary microprocessor 120*b*, a filter constant memory 122*a* (setting device) for an input filter which memory is provided at the indirect input signal interface circuit 122*b*, and an input abnormality code memory 122*c* provided in correspondence with the indirect input signal. Further mounted are a filter constant memory 123*a* (setting device) for an analog input filter which memory is provided at an input part for the multi-channel AD converter 123*b*, an analog input abnormality code memory 123*c* provided in correspondence with the analog input signal, an output abnormality code memory 124*c* provided in correspondence with the indirect output signal interface circuit 124*b* with which the output abnormality code memory 124*c* is connected in parallel, an auxiliary program memory 125, an auxiliary RAM 126*b*, a status memory 129*a* described later referring to FIG. 6*a*, and a selection data memory 129*b* described later referring to FIG. 6*b*.

The mentioned input abnormality code memories 122*c* and 123*c* are memories for storing presence or absence of any abnormality such as disconnection or short circuit occurred in any sensor itself or in any input signal wiring of the second vehicle-mounted sensor group 102*b* and/or the second analog sensor group 103*b*, and a detail abnormality information code number. The output abnormality code memory 124*c* is a memory for storing presence or absence of any abnormality such as disconnection or short circuit occurred in the second electrical load group 104*b* or in output signal wiring thereof, and a detail abnormality information code number. Filter constant to be stored in the mentioned filter constant memories 122*a*, 123*a* is stored in the program memory 115*b* on the side of the master station, and set at the time of initial setting. Numeral WD2 designates a watchdog clear signal, being a pulse train generated by the auxiliary microprocessor 120*b*. Numeral RST2 designates a reset pulse with which the microprocessor 110*b* starts the auxiliary microprocessor 120*b* again when the microprocessor 110*b* monitors a pulse width of the watchdog clear signal WD2 and detects that the pulse width thereof goes over a predetermined value.

An abnormality storage circuit 131*b* provided on the electronic board is comprised of a flip-flop circuit provided with a set input S and a reset input R. The mentioned abnormality storage circuit 131*b* stores therein operations of the reset pulses RST1 and RST2 or the first and second abnormality detection outputs ER1 and ER2 to drive the abnormality alarm display 108. Numeral 132*b* designates drive stop means serving as a gate element. The inverting drive element 137 is arranged so as to drive the load power supply relay 107*a* via the mentioned drive stop means 132*b* from the driving output DR2 generated by the auxiliary microprocessor 120*b*. The load power supply relay 107*a* is operated when the driving output DR2 is generated, and the abnormality storage circuit 132*b* does not store any abnormality. In addition, the auxiliary microprocessor 120*b* generates the driving output DR1 to hold the operation of the power supply relay 106*a* as well as generates the second abnormality detection output ER2 described later referring to FIG. 7. That is, the auxiliary microprocessor 120*b*, the auxiliary program memory 125 and the auxiliary RAM 126*b* make up the common control circuit 120*a* described in the foregoing first embodiment.

FIGS. 6(*a*) and 6(*b*) show diagrams reach for allocating the regular reply data in FIG. 5. Referring to FIG. 6(*a*), the mentioned status memory 129*a* is comprised of bits indicated by b0 to b7, and among them low-order 4 bits represent an address of the regular reply data. When contents of the low-order 4 bits are 0H (H means hexadecimal), it means that the ON/OFF states of not more than 16 points of second vehicle-mounted sensor group 102*b* are stored in the reply data 1 and the reply data 2 of the regular reply packets 203*c* and 203*d* in FIG. 2. When contents of low-order 4 bits are 1 to FH (H means hexadecimal), it means that digital conversion values of not more than 15 points of second analog sensor group 103*b* are stored in the reply data 1 and the reply data 2 of the regular reply packets 203*c* and 203*d* in FIG. 2. Furthermore, content of the mentioned status memory 129*a* is sent back as it is to be used as the reply data 3 in the regular reply packet.

Among the high-order 4 bits of the status memory 129*a*, a bit b7 is a flag bit representing whether or not any receiving interval abnormality is detected by the receiving interval detection means 715, described later referring to FIG. 7. A bit b6 is a flag bit representing whether or not any abnormality code is written in the selection data memory 129*b*. When executing the readout request to the microprocessor 110*b*, the bit b6 is activated to be logic 1.

In FIG. 6(*b*), low-order 2 bits in the selection data memory 129*b* represent a code number for the break or short circuit abnormality of the input/output. For example, abnormality of breaking wire causes a bit b0 to be logic 1 and the abnormality of short circuit causes a bit b1 to be logic 1. High-order 6 bits of the selection data memory 129*b* represent an input/output number (address) of the second vehicle-mounted sensor group 102*b*, the second analog sensor group 103*b* and the second electrical load group 104*b*. In addition, number of the input/output, which changes from normal state to abnormal state, and an abnormality code thereof are stored in the selection data memory 129*b*. Further the address of the selection data memory 129*b* is, for example, FFH. Furthermore, in the case where a plurality of input/output abnormalities occur at the same time, the abnormality data are temporarily stored in a preceding input/preceding output table, not shown, and the abnormality data are entirely sent back in sequential order.

Operation of the auxiliary microprocessor 120*b* in the vehicle-mounted electronic control apparatus according to the second embodiment of this invention of above arrangement will be hereinafter described with reference to a flowchart of FIG. 7. The auxiliary microprocessor 120*b*, that is activated regularly, starts operation instep 700. In step 701, it is determined whether or not any abnormality code has been newly written in the input/output abnormality code memories 122*c*, 123*c* and 124*c*. The program proceeds to step 702 when the determination is YES in step 701, in which this abnormality code is stored and held. In subsequent step 703, input/output number of the occurred abnormality and an abnormality code are stored as shown in FIG. 6(*b*), and the readout request by the bit b6 of the status memory 129*a* is set. When the determination in step 701 is NO, or following step 703, the program proceeds to step 704, in which it is determined whether or not the transmission request is outputted by means of a control signal line, not shown.

When any transmission request is present in step 704, the program proceeds to step 705, in which a transmission authorization (READY) is carried out through the control signal line, not shown, to the master station. Subsequently in step 706, a series of data received from the master station are stored. This step 706 is equivalent to a storing operation in the first storage means 300 in FIG. 3. In subsequent step 707, the sum check for a series of data received in step 706 is carried out, and this step 707 is equivalent to the abnormality determination means 307 in FIG. 3. Then, the program proceeds to step 710, in which it is determined whether or not there is any abnormality in the received data. When it is determined normal, the program proceeds to step 711, in which the abnormality counter, that is count-driven in step 720 described later, is reset. In subsequent step 712, it is determined whether the received data in step 706 is a readout request packet or an output/setting packet. When the received data are determined the readout request, a readout request command 30H and address are temporarily stored in step 713.

When the received data are determined the output/setting in step 712, the program proceeds to step 714, in which the ACK•61H and the address are temporarily stored. Then, the program proceeds to step 715, in which it is determined whether or not the receiving interval timer, not shown, goes over a predetermined time. When the time over is determined herein, the second abnormality detection output ER2 is set in step 716 as well as a bit b7 of the status memory 129*a* is set to be logic 1. On the contrary, when it is determined not going over the time period in step 715, or after the second abnormality detection output ER2 is set in step 716, the program proceeds to step 717, in which the receiving interval timer, not shown, is reset and started again. In subsequent step 718, write data obtained in step 706 are stored in a device memory of a specified address. The forgoing step 718 is equivalent to the distribution storage means in FIG. 2.

When any abnormality is determined in step 710, the program proceeds to step 720, in which the abnormality counter, not shown, is driven. In subsequent step 721, it is determined whether or not a present value of the abnormality counter goes over a predetermined value. When going over is determined, the program proceeds to step 722, in which the second abnormality detection output ER2 is outputted. On the other hand, when the present value of the counter is less than a predetermined value, or after the second abnormality detection output ER2 is outputted in step 722, the program proceeds to step 723 in which NACK•82H and address are temporarily stored. Step 724 is a block comprised of steps 713, 714 and 723, and this block is equivalent to the second storage means 320 in FIG. 3.

Furthermore, step 725 is a block comprised of steps 710 and 712, and this block is equivalent to the reply packet generation means 317 in FIG. 3. Note that in this embodiment, the NACK reply code in correspondence to the readout or output/setting packet is not separated. As shown in FIG. 3, however, it is possible to be separated into 62H or 72H. Step 726 is a step for ending operation, in which the mentioned step 700 for starting the operation is activated again, whereby the control operation will be repeated again.

When the determination in step 704 is NO, the program proceeds to step 730, in which upon receiving the regular readout packet 201*c* of FIG. 2, it is determined whether or not the regular reply is authorized. When the determination herein is YES, the program proceeds to step 713, in which whether or not it is a time for the regular reply is determined. When it is the time for the regular reply, the program proceeds to step 732. In this step 732, the indirect input information, the status information and the address information provided by the second vehicle-mounted sensor group 102*b* and the second analog sensor group 103*b* are sent back using the reply data 1 to 3 in FIG. 6*a*. In subsequent step 733, stepping on the addresses of the reply data, the program proceeds to step 726 for ending the operation. In the foregoing step 733, however, upon taking a round of reply addresses, the program is automatically restored to the first address.

In the case where the determination in step 730 and step 731 is NO, and the regular reply is not authorized, or it is not the regular reply time, the program proceeds to step 740. In this step 740, a variety of reply data and address data, which are stored in the mentioned second storage means 724, are read out on the basis of the preceding input/preceding output. In subsequent step 741, it is determined whether or not any reply data are stored in the second storage means 724. In the case of the presence of the reply data, the program proceeds to step 742, in which it is determined whether or not the reply data, which is read out in step 740, are the readout request stored in step 713. When the determination is YES herein, the program proceeds to step 743, in which the readout data concerning a device of a specified address are sent back together with the corresponding address.

In subsequent step 744, it is determined whether or not the data sent back in step 743 are the reply of the selection data memory 129*b* in response to the readout request accompanied by occurrence of any input/output abnormality. When it is determined YES, the program proceeds to step 745, in which it is determined whether or not a content of a selected data are those of the same input/output number, and whether or not number of times thereof is not more than a predetermined number of times. When the determination herein is YES, the program proceeds to step 746, and contents of the input/output abnormality memories 122*c*, 123*c* and 124*c*, and contents of the bit b6 of the status memory 129*a* and those of the selection data memory 129*b* to be replied are reset. When the determination is NO, the program proceeds to step 747, in which contents of the input/output abnormality code memories 122*c*, 123*c* and 124*c* to be replied are not reset. However, contents of the bit b6 of the status memory 129*a* and those of the selection data memory 129*b* are reset. Further, when the determination in step 744 is NO, or after completing the operations in steps 746 and 747, the program restores from the operation end step 726 to the operation start step 700.

When there is no readout request in step 742, the program proceeds to step 750, in which it is determined whether the reply data read out in the mentioned step 740 are the ACK stored in step 714 or the NACK stored in step 724. When it is determined ACK, the program proceeds to step 751, in which it is determined whether or not the regular reply is authorized. When it is not authorized, the recognition data ACK and the corresponding address are sent back in step 752. On the other hand, when it is determined NACK instep 750, the program proceeds to step 753, in which the no-recognition data NACK and the corresponding address are sent back. When the determination in step 741 is NO, or when the determination in step 751 is YES, and at the time of step 752 or 753 ending, the program ends the operation, and returns to the start step 700. In addition, step 754 is a block comprised of steps 743, 752 and 753, and this block is equivalent to the reply packet composing means 338 in FIG. 3. Furthermore, step 755 is a block comprised of steps 750 and 751, and this block is reply omission means for the normal receiving packet.

The mentioned operations can be summarized as follows. Steps 701, 702 and 703, and steps 744, 745 and 746 are steps regarding an input/output abnormality processing described later in FIG. 8. In steps 704 to 724, carried out are a temporary storage of provisional reply data and address by step 706 serving as the first storage means, step 725 serving as the reply packet generation means and step 724 serving as the second storage means. In steps 704 to 724, distribution and storage of write data in a device of a specified address is also carried out. Steps 730 to 733 are carried out for the purpose of regularly sending back the indirect input data. In the case where there are many indirect input data, addresses are sequentially updated and regularly sent back in step 733. In steps 740 to 753, the provisional reply data and addresses, that are temporarily stored in step 724 serving as the second storage means, are read out on the basis of the preceding input/preceding output, and actually sent back in step 754 serving as the reply packet composing means. In these steps, the ACK reply to the output/setting command in regular replying is omitted. Instead, when the normal receiving interval goes over a predetermined time, the status abnormality is set in step 716, and the mentioned status information is regularly sent back in step 732.

The mentioned operations are now supplementarily described referring to a time chart in FIG. 8. FIG. 8(*a*) shows an example of a waveform in the case where any abnormality such as disconnection or short circuit occurs at any input/output of the second vehicle-mounted sensor group 102*b*, the second analog sensor group 103*b* and the second electrical load group 104*b* in FIG. 5. A part indicated by numeral 800 in the chart shows a short-time abnormality. A part indicated by numeral 801 shows occurrence of a long-time abnormality occurring. FIG. 8(*b*) shows a waveform in the state of storing the input/output abnormality code memories 122*c*, 123*c* and 124*c* in FIG. 5. Apart of numeral 810 is set with the rising of the mentioned abnormality waveform 800, and reset with a readout reply waveform 860 described later.

Likewise, a part of numeral 811 is set with the rising of the abnormality waveform 801, and reset with a readout reply waveform 861 described later. As the waveform 801 maintains a logic “H” level, being immediately reset, a waveform 812 is generated. With respect to the second-time readout reply waveform 862, however, the waveform 812 is not reset, and maintains the logic “H” so as not to generate a reset waveform 813. In addition, a set operation represented by the waveforms 810, 811 and 812 is executed in step 702 in the flowchart of FIG. 7. Non-occurrence of the reset waveform 813 corresponds to the case in which a predetermined number of times in step 745 of FIG. 7 are not more than two.

FIG. 8(*c*) shows a logical level of the bit b6 of the status memory 129*a* (see FIG. 6). Waveforms 820, 821 come to be “H” in logical level in cooperation with the mentioned waveforms 810, 811 in FIG. 8(*b*). However, a waveform 822 is set to a logical level “H” in cooperation with the rising of the waveform 812, and reset with the readout reply waveform 862. Likewise, FIG. 8(*d*) is a waveform showing whether or not there are any abnormality code and any input/output number written in the selection data memory 129*b* (see FIG. 6(*b*)). Parts of waveforms 830, 831 and 832 become the same as those in the waveforms 820, 821 and

822. In addition, each rise (leading edge) of the waveforms 820, 821 and 822, or the waveforms 830, 831 and 832 is set in step 703 of FIG. 7, and reset in step 746 or 747. The waveform 812, however, is not reset, and the input/output abnormality code memories 122*c*, 123*c* and 124*c* do not change from the normal state to the abnormal state, thus the waveform 822 and the waveform 832 still remain as they are reset.

FIG. 8(*e*) shows a waveform of the regular reply, and this waveform shows a time period of implementing step 732 in FIG. 7 as the logic "H". Readout request waveforms 850, 851 and 852 of FIG. 8(*f*) are readout request commands that the master station having received waveforms 840, 841, 842 and 843 of the regular reply of FIG. 8(*e*) monitors the bit b6 of the status memory 129*a* in the regular reply data. Further the master station transmits the readout request commands to the substation when the b6 is logic 1 (waveforms 820, 821 and 822). Referring to FIG. 8(*g*), readout reply waveforms 860, 861 and 862 show a time period for sending back the reply data in step 743 of FIG. 7 in response to the mentioned readout request commands.

The mentioned operations can be summarized as follows. Even in case of detecting any abnormality for a short time illustrated in the waveform 800, the input/output abnormality code memories 122*c*, 123*c* and 124*c* are self-held and reset so as to be capable of surely sending back the occurrence of the abnormality to the master station. When number of reply times of goes over a predetermined value, any reset is not carried out instep 745 of FIG. 7. Further, when occurring any continuous abnormality as illustrated in the waveform 801, the occurrence of abnormality is once reset with the waveform 812, and subsequently the waveform 812 is generated thereby enabling to confirm and detect the occurrence of abnormality.

After the occurrence of abnormality is confirmed and detected, the input/output abnormality code memories 122*c*, 123*c* and 124*c* are left as they are set, until they are power supply-interrupted and they are not reset with the waveform 813, or with a trailing of the waveform 801. In step 701 of FIG. 7, it is determined whether or not the input/output abnormality code memories 122*c*, 123*c* and 124*c* have changed from absence of the abnormality to presence of the abnormality. When occurrence of any abnormality becomes certain as illustrated in the waveform 812, step 701 does not determine YES again as to the input/output abnormality code memory of the same input/output number. However, when occurring any abnormality newly at any of the input/output abnormality code memories of the remaining input/output numbers, it is determined YES in step 701, and the abnormal state will be sent back by the operations described above.

Taking the foregoing description about the flowchart and time chart into consideration, the operation of the control apparatus according to this embodiment will be summarized referring to FIG. 5 mainly from the viewpoint of difference from FIG. 1. Referring to FIG. 5, the microprocessor 110*b* controls the first and second vehicle-mounted electrical load groups 104*a* and 104*b* based on the control program and control constant that are stored in the non-volatile program memory 115*b*. In the control, the first and second vehicle-mounted sensor groups 102*a* and 102*b*, and the first and second analog sensor groups 103*a* and 103*b* are used as input signals. However, the second vehicle-mounted sensor group 102*b*, the second analog sensor group 103*b* and the second vehicle-mounted electrical load group 104*b* make serial-communication indirectly with the microprocessor 10*b* via the first and second serial-parallel converters 117 and 127.

The second vehicle-mounted sensor group 102*b* and the second analog sensor group 103*b* are provided with the filter constant memories 122*a* and 123*a* serially transmitted from the program memory 115*b* when starting the operation. In addition, contents of the input/output abnormality code memories 122*c*, 123*c* and 124*c* are sent back to the microprocessor 10*b* via the selection data memory 129*b*, and basic operation of the microprocessor 10*b* is as shown in the flowchart of FIG. 4. The data stored in the selection data memory 129*b* based on the readout request are read out and/or stored in step 446 of FIG. 4 (in the foregoing first embodiment). In this connection, step 447 serves as the confirmation processing means for conducting the input/output abnormality determination. In the mentioned step 447, when number of times of reply due to a short-time abnormality as represented in the waveform 800 in FIG. 8(*a*) or to a continuous abnormality as represented in the waveform 801 goes over a predetermined value, abnormality in the foregoing input/output number is determined definite. Even if reply is stopped in step 745 of FIG. 7, the input/output abnormality in the foregoing number remains as it was established.

Embodiment 3.

FIG. 9 is to explain a vehicle-mounted electronic control apparatus according to a third preferred embodiment of the invention, and shows allocation of the regular reply data. FIG. 9(*a*) shows a status memory 129*c*. This status memory 129*c* is comprised of bits b0 to b7, among which low-order 6 bits thereof represent circulating addresses of the regular reply data. In addition, the bit b7 of the status memory 129*c* is a flag bit representing whether or not the receiving interval abnormality is detected by the receiving interval abnormality detection means described in step 715 of FIG. 7. Further, contents of the mentioned status memory 129*c* are sent back as they are to serve as the reply data 3 in the regular reply packets 203*c* and 203*d* (see FIG. 2).

FIG. 9(*b*) shows a selection data memory 129*d*, and low-order 2 bits of this selection data memory 129*d* represent a code number of abnormality due to disconnection or short circuit of the input/output. For example, when any abnormality due to break of wire is determined, the bit b0 comes to be logic 1. On the other hand, when any abnormality due to short circuit is determined, the bit b1 comes to be logic 1. Furthermore, high-order 6 bits show an input/output number (address) of the second vehicle-mounted sensor group 102*b*, the second analog sensor group 103*b* and the second electrical load group 104*b*.

In addition, number of the input/output changed from normality to abnormality and abnormality code thereof are stored in the selection data memory 129*d*. In the case where plural abnormalities occur at the same time, input/output number and the abnormality code thereof are stored in a second selection data memory 129*e*. When a larger number of input/output abnormalities occur at the same time, the whole replies are carried out in sequential order using the preceding input/preceding output table not shown. When the master station reads out contents of the selection data memory in response to the readout request command, for example, FEH or FFH can be specified as the address of the selection data memory 129*d* or 129*e* to read out the contents thereof.

FIG. 9(*c*) shows a regular reply data map, and the reply data 1 and the reply data 2 are those shown in the regular reply packet 203*c* or 203*d* of FIG. 2. When contents of the low-order 6 bits of the reply data 3 are 0H (H means hexadecimal), it means that an ON/OFF state of not more than 16 points of second vehicle-mounted sensor group 102*b* is sent back. When content of the low-order 6 bits of the reply data 3 is 1H (H means hexadecimal), it means that the first digital conversion value (resolution thereof is not more than 16 bits) out of not more than 15 points of second analog sensor group 103*b* is sent back. When content of the low-order 6 bits of the reply data 3 is 2H, it means that content of the first selection data memory 129*d* and the second selection data memory 129*e* is sent back. Thereafter, likewise the fifteenth digital conversion value is sent back and a circulating address for the reply restores from 2CH to 0H, thus circulation being made.

In addition, the bit b6 of the status memory 129*c* is an input/output abnormality occurrence flag. When any input/output abnormality does not occur (there is nothing that changes from absence of abnormality to presence of abnormality), a value of the b6 is set to logic 0, whereby reply omission means for skipping the whole reply circulating addresses 2H, 5H, 8H, . . . , 2CH can be used.

Embodiment 4.

Figure 10:
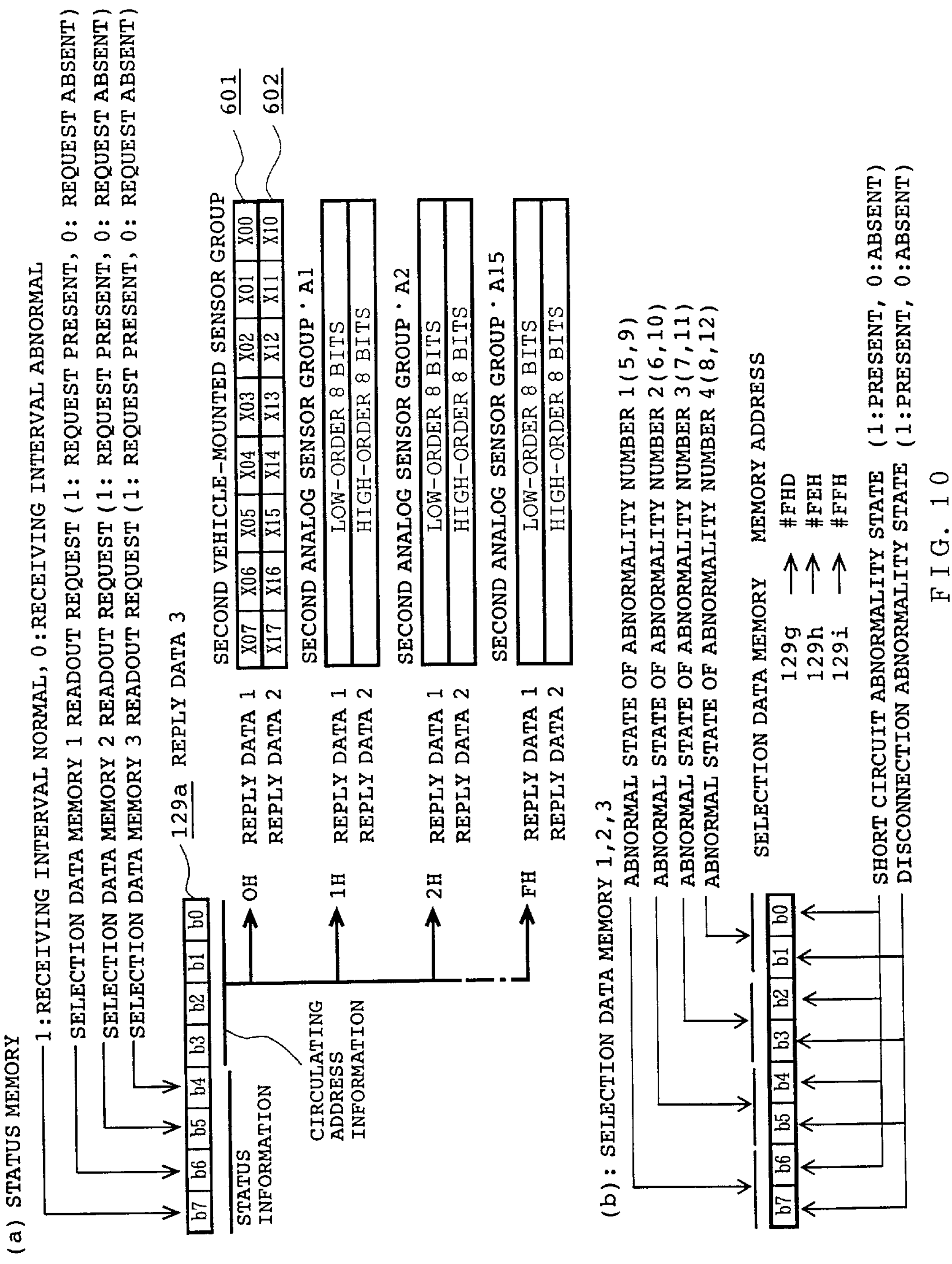
FIGS. 10(*a*) and (*b*) are allocation diagrams each showing a regular reply data of a vehicle-mounted electronic control apparatus according to a fourth preferred embodiment of the invention.

FIG. 10 is to explain a vehicle-mounted electronic control apparatus according to a fourth preferred embodiment of the invention, and shows a diagram for allocating the regular reply data. In this embodiment, selection data memories 129*g*, 129*h* and 129*i* themselves also serve as the input/output abnormality code memories in place of the input/output abnormality code memories 122*c*, 123*c* and 124*c*. FIG. 10(*a*) shows a status memory 129*f*. This status memory 129*f* is comprised of the bits b0 to b7, and low-order 4 bits thereof represent an address of the regular reply data.

When content of the low-order 4 bits is 0H (H means hexadecimal), it means that an ON/OFF state of not more than 16 points of second vehicle-mounted sensor group 102*b* is stored in the reply data 1 and the reply data 2 of the regular reply packet 203*c* or 203*d* of FIG. 2. When content of the low-order 4 bits is 1 to FH (H means hexadecimal), it means that a digital conversion value of not more than 15 points of second analog sensor group 103*d* are stored in the reply data 1 and the reply data 2 of the regular reply packet 203*c* or 203*d* of FIG. 2. Further, the content of the mentioned status memory 129*f* is sent back as it is as the reply data 3 of the regular reply packet.

Among high-order 4 bits of the status memory 129*f*, the bit b7 is a flag bit representing whether or not any receiving interval abnormality is detected by the receiving interval abnormality detection means described in step 715 referring to FIG. 7. The bit b6 is a flag bit representing whether or not any abnormality code is written in the selection data memory 129*g*. The bit b5 is a flag bit representing whether or not any abnormality code is written in the selection data memory 129*h*. The bit b4 is a flag bit representing whether or not any abnormality code is written in the selection data memory 129*i*. When carrying out the readout request to the microprocessor 110*b*, at least one of the bits b6 to b4 is activated so as to be logic 1.

In addition, in the case where a plurality of flag bits have come to logic "1", readout thereof is carried out in sequential order, and the flag bits are reset in response to the reply following the readout request. Further, when the flag bits b6 to b4 have come to logic "1", it means that any of the bits in the selection data memories 129*g*, 129*h* and 129*i* has changed from 0 to 1.

In FIG. 10(*b*), low-order 2 bits of the selection data memory 129*g*, to which a specified address #FDH is given, is a code number representing disconnection or short circuit abnormality of the abnormality number 1. For example, if it is a disconnection abnormality, the bit b0 becomes logic 1. On the other hand, if it is a short circuit abnormality, the bit b1 becomes logic 1. The following 2 bits of the selection data memory 129*g* show a code number representing disconnection or short circuit abnormality of the abnormality number 2. For example, if it is a disconnection abnormality, the bit b2 becomes logic 1. If it is a short circuit abnormality, the bit b3 becomes logic 1.

Thereafter, likewise high-order 2 bits of the selection data memory 129*g* show a code number representing disconnection or short circuit abnormality of the abnormality number 4. For example, if it is a disconnection abnormality, the bit b6 becomes logic 1. On the other hand, if it is a short circuit abnormality, the bit b7 becomes logic 1. The same operation as in the mentioned selection data memory 129*g* is performed also in the selection data memory 129*h* to which a specified address #FEH is given, or the selection data memory 129*i* to which a specified address #FFH is given. In this embodiment, 12 points of abnormality information are stored in three selection data memories 129*g*, 129*h* and 129*i*. In these abnormality numbers 1 through 12, not more than 12 points of inputs/outputs are extracted, the inputs/outputs being essential from the viewpoint of safety, out of the second vehicle-mounted sensor group 102*b*, the second analog sensor group 103*b* and the second electrical load group 104*b*. Then numbers 1 to 12 are allocated to the extracted inputs/outputs.

In addition to each embodiment described in the foregoing Embodiments 1 through 4, the following modifications can be made in these embodiments. That is, in the foregoing Embodiments 1 and 2, the common control circuit 120*a* transmits the input information from the second vehicle-mounted sensor group 102*b* or the second analog sensor group 103*b* to the microprocessor 110*a* on the master station side, or transmits the control output from the foregoing microprocessor 110*a* to the second electrical load group 104*b*. At is also preferable that the common control circuit 120*a* be reinforced or improved in the aspect of sharing functions, and a part of control of the electrical loads be implemented on the side of the common control circuit 120*a*.

In addition, it is also preferable that data frame serving as start and end determination means provided in each communication packet be omitted, and the determination of the start and end may be made using a control line connected between the master station and the substation. For example, a write control signal line and a readout control signal line are provided from the master station to the substation, and logical level of the write control signal line is brought to "H" in place of the output/setting command, whereby a transmission start and end of the write data, storage destination address data and checksum data can be instructed. Further, logical level of the readout control signal line is brought to "H" in place of the readout request command, whereby the transmission start and end of the readout destination address data and checksum data can be instructed.

Furthermore, the following prior art may be utilized in detecting disconnection or short circuit of any electrical load. That is, if a load current is excessive at the time of conducting and driving an open/close element connected in series to the electrical load, it is determined that any load short circuit occurs. If a voltage across the open/close element is excessively small, it is determined that any load disconnection occurs. Further, in the case of an inductive electrical load, the short circuit or disconnection of the load can be detected depending on whether or not an inductive surge voltage at the time of interrupting a current by any serial open/close element is not less than a predetermined value. In this case, as the short circuit and disconnection cannot be always distinguished, both bits b0 and b1 of the abnormality code are set to logic 1, for example. As for analog signals by means of a variable resistance, by providing a pull-up or pull-down resistance between input terminals or by connecting a serial resistance to both terminals of the variable resistance, it becomes possible to carry out the following control operations. That is, a tangled contact or breaking of signal wiring can be detected, a sharp change in the analog signal can be detected thereby carrying out abnormality determination, and the abnormality detection can be conducted by relatively comparing outputs of a pair of variable resistances provided in duplex system.

Furthermore, in the case selectively operating any one of a plurality of switches such as selector switch, it is possible to determine that any disconnection abnormality has occurred with the whole switches being OFF, and any short circuit abnormality has occurred with plural inputs simultaneously operating. However, result of determination by such simple and easy determination means is based on the fact that plural switches are regarded as one group, and any abnormality cannot be determined individually and separately switch by switch. The abnormality detection of the input/output may be limited to those indispensable for the purpose of safety, or those that can be easily abnormality-determined, and it is not always necessary to apply the abnormality detection to the whole inputs/outputs.

Additional Description of the Invention

The vehicle-mounted electronic control apparatus according to the present invention have additional features and advantages as follows:

In the vehicle-mounted electronic control apparatus including a common control circuit as defined in appended claim 1, the common control circuit is comprised of an auxiliary microprocessor, an auxiliary program memory and an auxiliary RAM. As a result of such arrangement, the auxiliary processor can share a part of control operations, thereby reducing a burden on the main microprocessor, eventually resulting in efficient serial communication.

In the mentioned vehicle-mounted electronic control apparatus, the down-serial data transmitted from the master station to the substation include an output/setting packet and a readout request packet. The up-serial data sent back from the serial-parallel converter for substation to the serial-parallel converter for master station are comprised of a receiving normality packet, a readout reply packet and a receiving abnormality packet. Thus an association between a command given by the down-serial data and a reply given by the up-serial data to the mentioned command may be established by the address data stored in each packet. As a result of such arrangement, bi-directional transmission and receiving can be conducted while confirming communication between the master station and substation. Further, when down-communication is more frequent at the time of starting the operation due to initialization, the output/setting packet is frequently used so that the readout request packet and the readout reply packet irregularly obtain the reply data. Thus frequency in up-reply is reduced, eventually resulting in efficient communication.

In the mentioned vehicle-mounted electronic control apparatus, the down-serial data transmitted from the master station to the substation include regular readout packet and the up-serial data sent back from the substation to the master station include a regular reply packet. Thus the regular reply packet may be regularly sent back with a time interval commanded by the command data. As a result of such arrangement, when up-communication is more frequent at the time of normal operation, the regular reply packet can send a reply without transmission of regular readout packet by the microprocessor for each reply. Consequently it becomes possible to reduce down-transmission data as well as up-response reply, eventually resulting in efficient communication.

In the vehicle-mounted electronic control apparatus including a common control circuit as defined in appended claim 5, the regular reply packet contains circulating address information for reply therein. Thus a content of the selection data memory may be sent back in sequential order while being classified by the circulating address information for reply. As a result of such arrangement, the common control circuit can send back various reply data to the microprocessor by updating the content of the selection data memory. Furthermore, by increasing address amount of the circulating address information for reply thereby composing a table address in which replay data of less frequency and plural reply data of more frequency are mixedly arranged, it becomes possible to send back urgent reply data more speedily.

In the mentioned vehicle-mounted electronic control apparatus, the regular reply packet contains therein readout request information. Thus content of the selection data memory may be sent back to the serial-parallel converter for master station by the readout reply packet that corresponds to the readout request from the serial-parallel converter for master station on the basis of the readout request information. As a result of such arrangement, when the regular reply data are more frequent, utilizing the readout request information can send content of the selection data memory back more speedily.

In the mentioned vehicle-mounted electronic control apparatus, the common control circuit includes a bus-connected input abnormality code memory and/or an output abnormality code memory. Thus contents of the bus-connected input abnormality code memory and/or the output abnormality code memory may be selectively stored in the selection data memory, or the bus-connected input abnormality code memory and/or the output abnormality code memory itself may be used as the selection data memory. As a result of such arrangement, it becomes possible to send back timely a large number of input and output abnormality information using a limited number of selection data memory.

In the mentioned vehicle-mounted electronic control apparatus, the common control circuit includes self-hold reset means and reply stop means with respect to the abnormality information stored in the input/output abnormality code memory, and the microprocessor includes confirmation-processing means of the received abnormality information. The self-hold reset means stores and holds the detected input/output abnormality and sends back the abnormality information to the microprocessor, thus resetting itself. The reply-stop means stops the resetting performed by the self-hold reset means and deletes the abnormality of an input/output number coming under, when number of times of reply from the selection data memory for the specific input/output number exceeds a predetermined value. The confirmation-processing means determines the abnormality by reading out the abnormality information plural number of times, whereby continuance of the input/output abnormality is confirmed and the reply stop is conducted after the confirmation. As a result of such arrangement, any temporal abnormality of input/output and continuous abnormality can be exactly detected without fail, and the input/output abnormality information is not sent back from the selection data memory after confirming the abnormality. Consequently the up-reply data can be surely reduced.

In the mentioned vehicle-mounted electronic control apparatus, the second vehicle-mounted sensor group includes an analog sensor group. A multi-channel AD converter digitally converts input from the analog sensor group, and the digitally converted data are supplied to the microprocessor by the readout reply packet or by the regular reply packet. As a result of such arrangement, by increasing input information treated on the common control circuit side, input/output pin number is restrained from being excessively large, and a system of high performance can be formed at a reasonable cost.

In the mentioned vehicle-mounted electronic control apparatus, the setting device bus-connected to the serial-parallel converter for substation is used as a filter constant setting memory of the digital filter for the ON/OFF information from the second vehicle-mounted sensor group or for the digital filter for the input signal from the analog sensor group bus-connected to the common control circuit through a multi-channel AD converter. As a result of such arrangement, capacitor for filter can be small-sized, and the filter constant can be changed on the software, making it possible to standardization of hardware. Furthermore, the filter constant can be set by concentrated transmission at the time of starting the operation when input/output information is less.

In the mentioned vehicle-mounted electronic control apparatus, the control apparatus includes a watchdog timer for monitoring the watchdog signal of the microprocessor, first and second mutual monitoring means for monitoring serial data between the master station and the substation, and an abnormality storage circuit for storing an abnormality detection output outputted by the reset pulse of the watchdog timer and by the first and second mutual monitoring means and for resetting the stored contents at the time of turning the power supply on. When the abnormality storage circuit stores any abnormality, driving any specific electric load is stopped, and an abnormality alarm display is operated. As a result of such arrangement, when any runaway of the microprocessor such as malfunction due to temporal noise has occurred, the microprocessor is immediately restarted. When the other abnormality has occurred, the microprocessor continues the operation so that output for fuel injection and ignition is continued, so as not to stop the operation of the internal combustion engine. When any abnormality has occurred, even if it is a temporal abnormality, driving the auxiliary electric load is stopped and alarm is indicated. The temporal abnormality can get recovered by restarting the internal combustion engine, thus safety and convenience can be satisfied.

In the mentioned vehicle-mounted electronic control apparatus, the first mutual monitoring means includes reply interval abnormality detection means, this reply interval abnormality detection means detects an abnormality detection output when the receiving interval of the regular reply packet exceeds a predetermined value. As a result of such arrangement, it is possible to improve monitoring function such as watching any runaway of the common control circuit using the microprocessor.

In the mentioned vehicle-mounted electronic control apparatus, the second mutual monitoring means includes receiving interval abnormality detection means. This receiving interval abnormality detection means detects an abnormality detection output when the receiving interval of the output/setting packet exceeds a predetermined value. The receiving interval abnormality means is provided with reply omission means for omitting the reply of the receiving normal packet corresponding to the output/setting packet when no receiving interval abnormality is detected. As a result of such arrangement, not only monitoring function using the microprocessor can be improved but also up-reply information can be reduced under the normal communication, eventually resulting in efficient communication.

In the mentioned vehicle-mounted electronic control apparatus, the regular reply packet contains status information. This status information regularly transmits a state of the common control circuit to the microprocessor and contains information about whether or not the result of detection detected by the reply interval abnormality detection means is normal. As a result of such arrangement, even when reducing or omitting the up-reply information under the normal communication, the microprocessor can recognize normal receipt in the common control circuit indirectly through the status information.

What is claimed is:

1. A vehicle-mounted electronic control apparatus comprising:

a microprocessor in which a program memory, an operational RAM, an interface circuit providing a connection to a first vehicle-mounted sensor group, an interface circuit providing a connection to a first electrical load group, and a serial-parallel converter for master station are bus-connected; and a common control circuit in which a serial-parallel converter for substation that is serial-connected to said serial-parallel converter for master station, an interface circuit providing a connection to a second vehicle-mounted sensor group, and an interface circuit providing a connection to a second electrical load group are bus-connected, the common control circuit being provided with first storage means, second storage means, abnormality determination means, distribution storage means, reply packet generation means, and reply packet composing means;

wherein said first storage means stores in sequential order command data, address data, write data, sum check collation data received by said serial-parallel converter for substation via said serial-parallel converter for master station;

said abnormality determination means monitors lack or mixing of any bit information in the data stored in said first storage means;

said distribution storage means transfers said write data to a device memory of a specified address based on said stored address data and said write data when said command data stored in said first storage means is a write/setting command accompanied by said write data;

said reply packet generation means selects reply data based on the result determined by said abnormality determination means and said command data, combines said reply data with said address data to synthesize reply information, and said reply information generated by said reply packet generation means is stored in sequential order into said second storage means and read out on the basis of a preceding input/preceding output while evacuating a delay in replying; and said reply packet composing means composes in a predetermined order plural reply information to be supplied to said serial-parallel converter for substation based on said reply information read out from said second storage means, and generates additional data based on the latest information and adds those data to said delayed and held reply information to send back resultant reply information.

2. The vehicle-mounted electronic control apparatus according to claim 1, wherein said common control circuit is comprised of an auxiliary microprocessor, an auxiliary program memory and an auxiliary RAM, said auxiliary microprocessor includes said first and second storage means, said abnormality determination means, said distribution storage means, said reply packet generation means and said reply packet composing means; and programs for each means of said auxiliary microprocessor are stored in said auxiliary program memory, and said auxiliary RAM is used to serve as a buffer memory in said first and second storage means and as an operation processing memory of said auxiliary microprocessor.

3. The vehicle-mounted electronic control apparatus according to claim 1, wherein down-serial data transmitted from said serial-parallel converter for master station to said serial-parallel converter for substation include an output/setting packet and a readout request packet each having data start/end determination means, bit information lack/mixing monitoring means and command identification means; and up-serial data sent back from said serial-parallel converter for substation to said serial-parallel converter for master station include a receiving normality packet, and readout reply packet and receiving abnormality packet each having data start/end determination means, bit information lack/mixing monitoring means and reply type identification means;

said output/setting packet includes at least a drive output to said second electrical load group, or write destination address data and write data for transmitting constant setting data to a setting device bus-connected to said serial-parallel converter for substation;

said readout request packet includes at least readout destination address data for requesting a transmission of ON/OFF information provided by said second vehicle-mounted sensor group;

said receiving normality packet includes receiving normal code data as reply data to said output/setting packet and preliminarily specified address data;

said readout reply data includes preliminarily specified address data as reply data to said readout request packet, and readout data of the address;

said receiving abnormality packet includes receiving abnormality code data for sum check abnormality as reply data to said output/setting packet or said readout request packet;

thus an association between a command given by said down-serial data and a reply given by said up-serial data to the mentioned command may be established by the address data stored in each packet.

4. The vehicle-mounted electronic control apparatus according to claim 3, wherein said down-serial data include a regular readout packet having start/end determination means, bit information lack/mixing monitoring means and command identification means; and said up-serial data include a regular reply packet having data start/end determination means and bit information lack/mixing monitoring means;

said regular readout packet includes specific address data and command data for specifying a regular readout interval;

said regular reply packet is added with reply data for sending back input signals from said second vehicle-mounted sensor group in sequential order or in a lump; and said regular reply packet regularly sends back the data regularly with an interval commanded by said command data, and stops the regular reply when said command data are either other than a predetermined number or a specific number.

5. The vehicle-mounted electronic control apparatus according to claims 1, wherein said second vehicle-mounted sensor group includes an analog sensor group, a multi-channel AD converter digitally converts input from said analog sensor group, and said digitally converted data are supplied to said microprocessor by said readout reply packet or by the regular reply packet to serve as control information of said first electrical load group and said second electrical load group.

6. The vehicle-mounted electronic control apparatus according to claim 1, further comprising a watchdog timer for monitoring watchdog signal of said microprocessor, first and second mutual monitoring means for monitoring serial data, and an abnormality storage circuit for storing an abnormality detection output;

wherein said watchdog timer monitors a watchdog clear signal generated by said microprocessor, and outputs a reset pulse to restart said microprocessor when pulse width of the clear signal exceeds a predetermined value;

said first mutual monitoring means is executed by said microprocessor and outputs an abnormality detection signal when any abnormality in sum check of the serial data sent back from said common control circuit or any delay timeout abnormality has continued a predetermined number of times;

said second mutual monitoring means is included in said common control circuit and outputs an abnormality detection signal when any abnormality in sum check of the serial data sent back from said common control circuit has continued a predetermined number of times;

said abnormality storage circuit stores therein said reset pulse and said abnormality detection output outputted by said first and second mutual monitoring means; and when said abnormality storage circuit stores any abnormality, driving any specific electric load is stopped, and an abnormality alarm display is operated.

7. The vehicle-mounted electronic control apparatus according to claim 6, wherein said first mutual monitoring means includes reply interval abnormality detection means, and said reply interval abnormality detection means detects an abnormality detection output when the receiving interval of the regular reply packet exceeds a predetermined value.

8. The vehicle-mounted electronic control apparatus according to claim 7, wherein said regular reply packet contains status information, and said status information regularly transmits a state of said common control circuit to said microprocessor and contains information about whether or not the result of detection detected by said reply interval abnormality detection means is normal.

9. The vehicle-mounted electronic control apparatus according to claim 6, wherein said second mutual monitoring means includes receiving interval abnormality detection means, and said receiving interval abnormality detection means detects an abnormality detection output when a receiving interval of said output/setting packet exceeds a predetermined value, said receiving interval abnormality means comprising reply omission means for omitting the reply of the receiving normal packet corresponding to said output/setting packet when no receiving interval abnormality is detected.

10. A vehicle-mounted electronic control apparatus comprising:

a microprocessor in which a program memory, an operational RAM, an interface circuit providing a connection to a first vehicle-mounted sensor group, an interface circuit providing a connection to a first electrical load group, and a serial-parallel converter for master station are bus-connected; and a common control circuit in which a serial-parallel converter for substation that is serial-connected to said serial-parallel converter for master station, an interface circuit providing a connection to a second vehicle-mounted sensor group and an interface circuit providing a connection to a second electrical load group are bus-connected, the common control circuit being provided with a selection data memory;

wherein down-serial data transmitted from said serial-parallel converter for master station to said serial-parallel converter for substation include an output/setting packet and a readout request packet;

up-serial data sent back from said serial-parallel converter for substation to said serial-parallel converter for master station include a readout reply packet and a regular reply packet;

said output/setting packet includes at least a drive output to said second electrical load group, or write destination address data and write data for transmitting constant setting data to a setting device bus-connected to said serial-parallel converter for substation;

said readout request packet includes at least readout destination address data for requesting a transmission of ON/OFF information provided by said second vehicle-mounted sensor group;

said readout reply packet includes at least readout data having a preliminarily specified address as reply data to said readout request packet;

said regular reply packet includes at least reply data for sending back input signals from said second vehicle-mounted sensor group in sequential order or in a lump;

said selection data memory is a memory containing information of irregular data that are stored in a memory having one or plural specified addresses by said common control circuit, and are sent back from said serial-parallel converter for substation to said serial-parallel converter for master station so that the information is sent back to said serial-parallel converter for master station by said readout reply packet or said regular reply packet.

11. The vehicle-mounted electronic control apparatus according to claim 10, wherein said regular reply packet contains circulating address information for reply so that a content of said selection data memory may be sent back in sequential order, in addition to the input signal from said second vehicle-mounted sensor group, while being classified by said circulating address information for reply.

12. The vehicle-mounted electronic control apparatus according to claim 10, wherein said regular reply packet contains readout request information, and said readout request information is a status information that said common control circuit selects each data being out of regular reply data and requests said microprocessor to read out the selected data, whereby content of said selection data memory may be sent back to said serial-parallel converter for master station by the readout reply packet that corresponds to the readout request from said serial-parallel converter for master station on the basis of said readout request information.

13. The vehicle-mounted electronic control apparatus according to claim 10, wherein said common control circuit includes a bus-connected input abnormality code memory and/or an output abnormality code memory;

said input abnormality code memory stores presence or absence of any abnormality such as disconnection or short circuit occurred in said second vehicle-mounted sensor group and/or in any input signal wiring and detailed abnormality information code number; and said output abnormality code memory stores presence or absence of any abnormality such as disconnection or short circuit occurred in said second electrical load group and/or in any output signal wiring and detailed abnormality information code number; and contents of said input abnormality code memory and said output abnormality code memory are selectively stored in said selection data memory, or said input abnormality code memory and the output abnormality code memory themselves are used as said selection data memory.

14. The vehicle-mounted electronic control apparatus according to claim 13, wherein said common control circuit includes self-hold reset means and reply stop means with respect to the abnormality information stored in said input abnormality code memory and said output abnormality memory, and said microprocessor includes confirmation-processing means of the received abnormality information;

said self-hold reset means stores and holds the detected input/output abnormality and sends back the abnormality information to said microprocessor, thus resetting itself;

said reply-stop means stops the resetting performed by said self-hold reset means and deletes the abnormality of an input/output number coming under, when number of times of reply from said selection data memory for the specific input/output number exceeds a predetermined value;

said confirmation-processing means determines the abnormality by reading out the abnormality information plural number of times, whereby continuance of the input/output abnormality is confirmed and the reply stop is conducted after the confirmation.

15. The vehicle-mounted electronic control apparatus according to claim 10, wherein said setting device bus-connected to said serial-parallel converter for substation is a filter constant setting memory of the digital filter for the ON/OFF information from said second vehicle-mounted sensor group or for the digital filter for the input signal from the analog sensor group bus-connected to said common control circuit through a multi-channel AD converter.

* * * * *